AUTOMATIC TELEPHONE SYSTEMS

Filed March 31, 1952 11 Sheets-Sheet 1

INVENTOR
F.P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 2

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 3

INVENTOR
F.P. GOHOREL
BY
Robert Harding Jr.
ATTORNEY

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 5

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 6

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 7

INVENTOR
F. P. GOHOREL
BY
Robert Harding Jr
ATTORNEY

INVENTOR
F. P. GOHOREL
BY
Robert Harding Jr.
ATTORNEY

AUTOMATIC TELEPHONE SYSTEMS

Filed March 31, 1952 11 Sheets-Sheet 9

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 10

INVENTOR
F. P. GOHOREL
BY
Robert Harding Jr.
ATTORNEY

Sept. 4, 1956 F. P. GOHOREL 2,761,907

AUTOMATIC TELEPHONE SYSTEMS

Filed March 31, 1952 11 Sheets-Sheet 11

INVENTOR

F. P. GOHOREL

BY

Robert Harding Jr.

ATTORNEY

United States Patent Office 2,761,907

Patented Sept. 4, 1956

2,761,907

AUTOMATIC TELEPHONE SYSTEMS

Fernand Pierre Gohorel, Antony, France, assignor to International Standard Electric Corporation, New York, N. Y., a corporation of Delaware Application March 31, 1952, Serial No. 279,624

Claims priority, application France April 11, 1951

26 Claims. (Cl. 179—22)

The present invention relates to automatic telephone systems wherein a common member or director is used to direct several finders or selectors in each finding or selecting stage. It describes particular arrangements of finders, selectors and directors that make it possible, on the one hand, to establish a connection through a small number of finding or selecting stages and, on the other hand, to reduce to a minimum the number of finders or selectors, and hence the number of contacts, required in each stage.

One of the features of the invention consists in that the subscribers of an exchange are divided into a certain number of groups, and in that two sets of switching equipment are used, one of them, which is individual to each subscriber group, being used, on the one hand, to connect the calling subscriber to the selecting stage and, on the other hand, to select the called subscriber from among the group of subscribers, the other set of switching equipment, which is common to all the subscribers of an exchange, being used to select the group of the called subscriber within said exchange.

Another feature of the invention is that the subscribers of each group are divided into sub-groups and that the connection of the calling subscriber to the selectors is provided by means of a first finder and of a second finder, a director associated with the second finder being used to select the calling sub-group from among the various sub-groups in a group, and another director, associated with the first finder, being used to select a subscriber from among those in said sub-group, said directors being arranged in such a way that all the subscribers in a group are served in common by the same first finder directors and that each of said directors has access to several second finder directors individually associated therewith.

Another feature of the invention resides in the fact that the subscribers of one and the same group are divided into several sub-groups and that connection of the group selecting switches to the called subscriber is accomplished by means of a sub-group selector and of a final selector, a director associated with a sub-group selector being used to select the called sub-group from among the various sub-groups in a group, with another director, associated with a final selector, being used to select the called subscriber from among the subscribers in said sub-group, said directors being arranged in such a way that all the subscribers in a group are served in common by the same final selector directors and that each of said directors is accessible to several sub-group selector directors individually associated therewith.

Another feature of the invention lies in that the first finder and the final selector are combined into a single unit (connecting finder), which is controlled by a director capable of serving both as a finder for the calling subscriber and as a selector for the called subscriber.

Another feature of the invention consists in that, when the subscriber lifts his receiver, his call is received at all the finder-connector directors serving his group and then is transmitted, by each of said directors, to one of the associated second-finder directors, each finder-connector director registering two indications, one of which concerns the level of the subscriber in the sub-group and the other the level of the sub-group in the group, and thereupon transmitting said second indication to the second-finder director associated with it.

Another feature of the invention is the fact that each second-finder director is designed to hunt, even in the absence of any call, for a second finder associated with an available register link giving access to at least one available register.

Another feature of the invention is the fact that, once the indications concerning the calling sub-group and the level of the subscriber in the sub-group have been registered in the second-finder director and in the finder-connector director, respectively, and once the second-finder director has chosen a second finder associated with a link capable of routing the call, said director proceeds to hunt for an available connecting finder serving the calling sub-group, causes the connection of the chosen second-finder to the selected connecting finder, and then connects said finder-connector to the calling subscriber.

Another feature of the invention consists in that, after the calling subscriber has been connected to the register link through a finder-connector and a second finder, a register-finder director starts hunting for said register link, chooses a register finder associated with an available register and then causes the connection of the selected finder to the calling link, the calling subscriber then being connected to said register through a connecting finder, a second finder, a register link and a register finder.

Another feature of the invention consists in that, if all the registers accessible to the calling link become busy before said link has had time to connect to the available register, the second-finder director releases the second finder seized, hunts for another finder through which the call may be routed, and causes said second finder to be connected to the finder-connector seized by the calling subscriber.

It is possible to design individual switches comprising a great number of wires, but to the detriment of the total number of lines that are accessible to such individual switches. Now, the number of register links may be rather high and a great many outgoing lines may be required.

Another feature of the invention lies in that there are associated with each register several finders each giving access to a group of different links, the register-finder director choosing a finder associated with an available register and providing access to the group in which the calling link is included.

It may be of interest to point out that the position occupied by a subscriber on the banks of the line selecting switches, and thence, the sub-group to which he belongs and the level he occupies in said sub-group, are not necessarily dependent on his telephone number, since a given call designation can be assigned to a line that occupies any position whatsoever by simply moving some movable connections.

Another feature of the invention is the fact that, once the called-subscriber group has been selected, the portion of the call sign characterizing said subscriber with respect to the group is registered by the sub-group selector director, said director then causing the seizure of the associated finder-connector director, if free, and sending the received call sign to said director; this director translates the call sign and registers the indications relating to the called sub-group and the level of the called-subscriber in the sub-group, respectively, the first of these indications being thereupon transmitted to the sub-group selector director.

Another feature of the invention consists in that, when the two indications, regarding the called sub-group and the level of the called subscriber in said sub-group, have been registered in the sub-group selector director and in the finder-connector director, respectively, the first of these directors starts hunting for an available finder-connector capable of serving the called sub-group, causes the connection of the sub-group selector to the selected finder-connector and then the connection of the finder-connector to the called subscriber.

Another feature of the invention resides in the fact that there is provided in the finder-connector director a marking or dialing distributor, wherein each input terminal corresponds to one of the call signs of the subscribers in the group and each output terminal corresponds to the position occupied by the subscriber line with respect to the line selecting switches, in such a manner that it is possible, by simply moving some movable connections, to assign a given call sign to any line whatever in the group.

When a subscriber has several lines all grouped under the same call number, it is important to be able to distribute said lines in any desired fashion among the various sub-groups of the subscriber group served by the same set of switching equipment. In this manner, two or more additional lines can be provided for a subscriber having only one line, and in general this arrangement allows increasing the number of lines in a group to the extent that there are positions available on the banks of said switches, regardless of what positions they are.

Another feature of the invention is that, when the finder-connector director receives a call sign associated with a multi-line subscriber, it translates this call sign and, for each of the lines, it registers two indications, one regarding the sub-group in which said line is included and the other regarding the position of the line in said sub-group, the second indication being sent to the sub-group selector director and arrangements being made of chain circuits so that only one sub-group and one line in said sub-group are selected.

When several lines are included in one group associated with one and the same call sign, it may be desirable to be able to reach a given one of the lines of this group by using a particular call sign. Such would be the case, for instance, of a group line which, during the night, is connected to a special station.

Another feature of the invention lies in the fact that, when the finder-connector director receives a call sign associated with a given line in a group, it translates this call sign and registers two indications, one regarding the sub-group in which said line is included and the other the level occupied by the line in the sub-group, the first indication being sent to the sub-group selector director, and arrangements being provided to prevent any mix-up between the device that registers the indications regarding the wanted line and that corresponding to the other lines in the group.

Another feature of the invention lies in the fact that the marking distributor output terminal associated with a group line having a particular call sign is connected, by means of movable connections, on the one hand to the input terminal associated with the common call sign of the group and on the other hand to the terminal associated with said particular call sign, a rectifier being provided in one of said connections to prevent any mix-up between the various terminals.

It may happen, when a call is being routed to the called subscriber, that the sub-group selector does not have access to any free line terminating in a finder-connector serving the called sub-group.

Another feature of the invention consists in that, when the finder-connector director is not associated with any finder-connector capable of serving the called sub-group, the circuits transmitting the called sub-group indication to the sub-group selector director are changed in such a way that said director starts hunting for an available cooperating selector having access to at least an available finder-connector capable of serving the called sub-group, said director thereupon transmitting a suitable signal to the register and then connecting the sub-group selector to the selected cooperating selector; once this connection is made, the seized directors are released, the register sends to the cooperating selector the portion of the call sign that characterizes the called subscriber in the group, and the cooperating selector starts at once hunting for an available finder-connector capable of serving the called sub-group.

Another feature of the invention lies in the fact that, if all the finder-connectors connected to the cooperating selector banks and capable of serving the called sub-group should become busy before there is time to select one of them, said cooperating selector will transmit to the register a signal identical with that sent before by the sub-group selector when hunting for a cooperating line, the register being in such a condition, as a result of having received the first signal, that when it receives a second, identical signal it causes the release and that of the whole chain of different seized members.

Another feature of the invention lies in the fact that, when several lines associated with one and the same call sign are included in different sub-groups, and if, out of these sub-groups, some have available finder-connectors and some have not, the director associated with the sub-group selector does not hunt over the cooperating group, but rather chooses an available finder-connector, priority being thus given to the group lines that can be reached without the help of a cooperating selector.

Another feature of the invention resides in the fact that, if all the lines associated with one and the same call sign are included in sub-groups that have no available finder-connectors, the director associated with the sub-group selector chooses an available cooperating selector having access to at least an available finder-connector capable of serving one of said sub-groups.

In the exchange, a system of switches providing high selection capacities by means of the "double selection" method are used to select the called group. A "first" selector starts hunting for an available "second" selector giving access to at least one free line in the called group, the second selector thereupon selecting a free line in said group. Control devices or directors are associated with each of said selectors, it being possible to use one and the same director for several selectors of one stage.

Another feature of the invention is that the first selector director comprises, for each line terminating in a second selector, a set of several chain wires, each wire corresponding to the outgoing lines in said second selector serving a given group, arrangements being provided, when all the lines of a group are busy, to bias the respective wire electrically in such a way as to render impossible the seizure of the second selector in the event the number dialed is that of said group.

One and the same director may be used to serve several sets of first selectors, i. e., several groups of selectors having access to one and the same outgoing line multiple arrangement. Under these conditions, said director serves a large number of lines and, unless special precautions are taken, a large number of chain wires are required.

Another feature of the invention is that the first selector outgoing lines are arranged so that the various lines occupying the same level in the various sets terminate in second selectors having the same outlets, said lines therefore finding the same busy or available condition at the output of the second selectors to which they are connected, and one and the same set of chain wires being thus used for all these lines.

One first selector may give access to several groups of lines each corresponding to a given selection combination, some of these groups being connected to second selectors assigned to handle local traffic, while the others terminate in second selectors assigned to handle outgoing traffic. Each of these groups handles a given traffic, which is not the same for the local groups as for the groups associated with distant offices and which may be different for any two local or any two outgoing groups. It is advisable therefore to assign to each group a number of lines corresponding to the traffic it handles.

Another feature of the invention resides in the fact that there is provided in the first selector director a dialing distributor, each input terminal of which is associated with one of the selection combinations used for directing said first selector, it being possible for several terminals to be associated with one and the same selection combination, and each output terminal of which is associated with a set of several first-selector outgoing lines, so that it is possible, by simply moving some movable connections, to associate one or more of said sets of lines with a given group.

Various other features will become apparent from the following description, given by way of a non-limitative example with reference to the appended drawings, in which.

Figure 5:
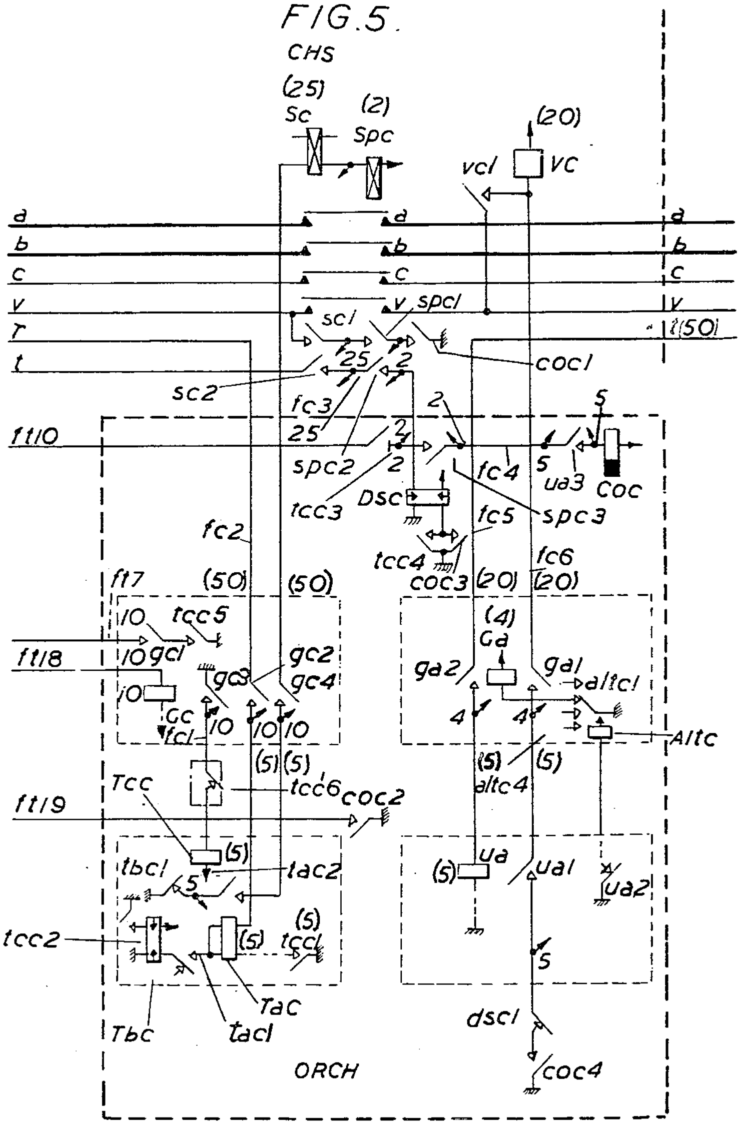
Figure 5A:
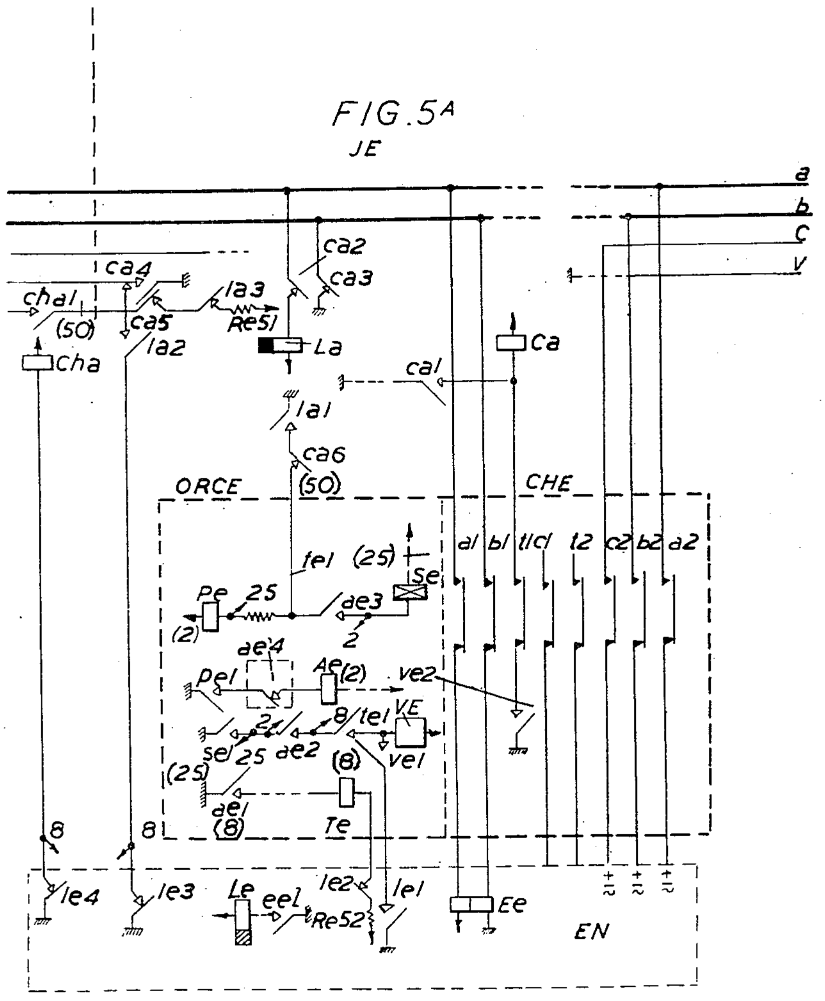

Figs. 5 and 5*a* show the circuit elements of a second finder, the respective director, a register link and a register (hereinafter by register link shall be understood the member that makes the connection between the register and the finders and selectors).

Figure 6:
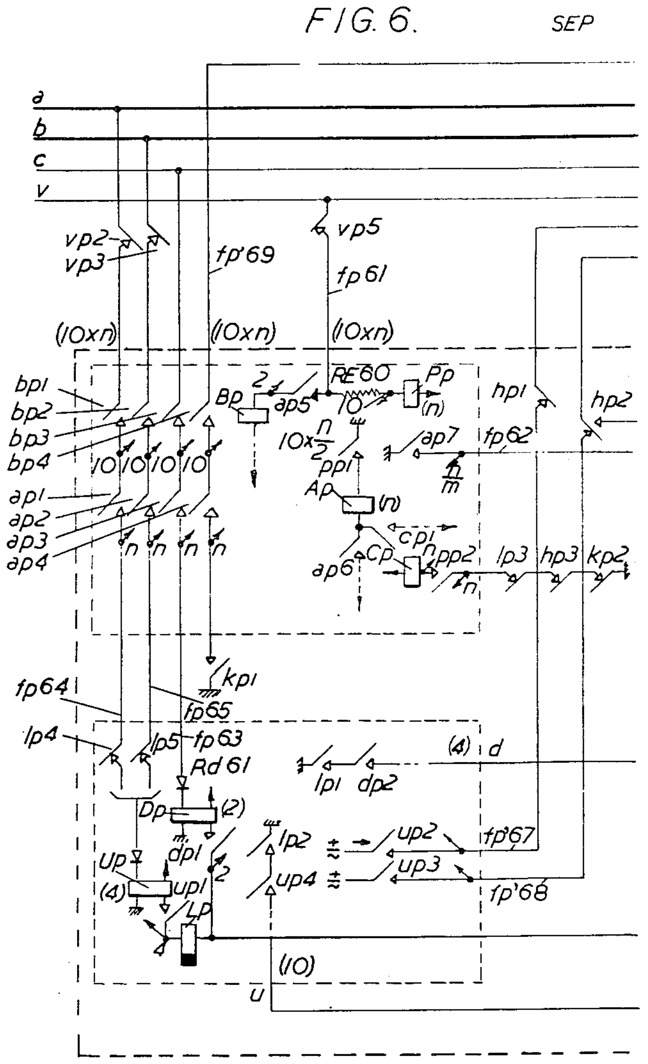
Figure 6A:
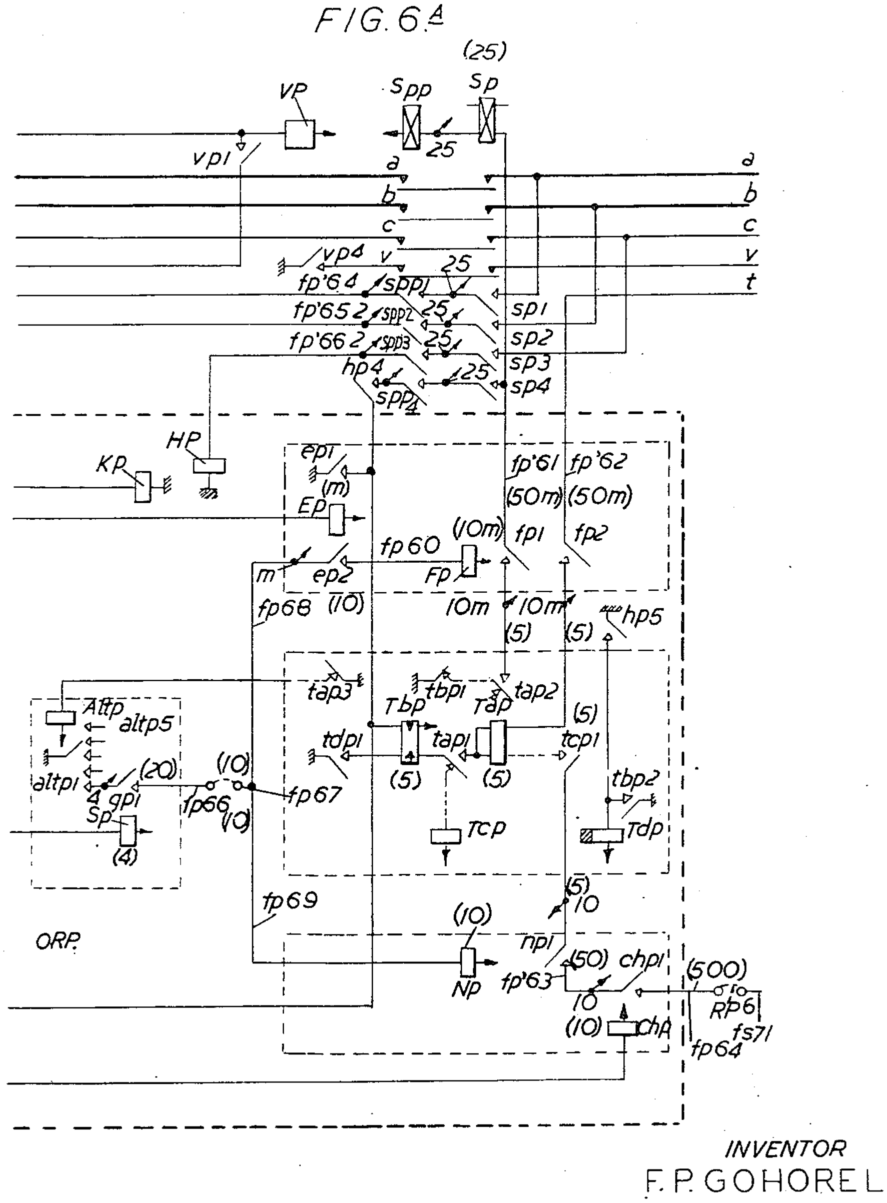

Figs. 6 and 6*a* show the circuit elements of a first selector and of the associated director.

Figure 7:
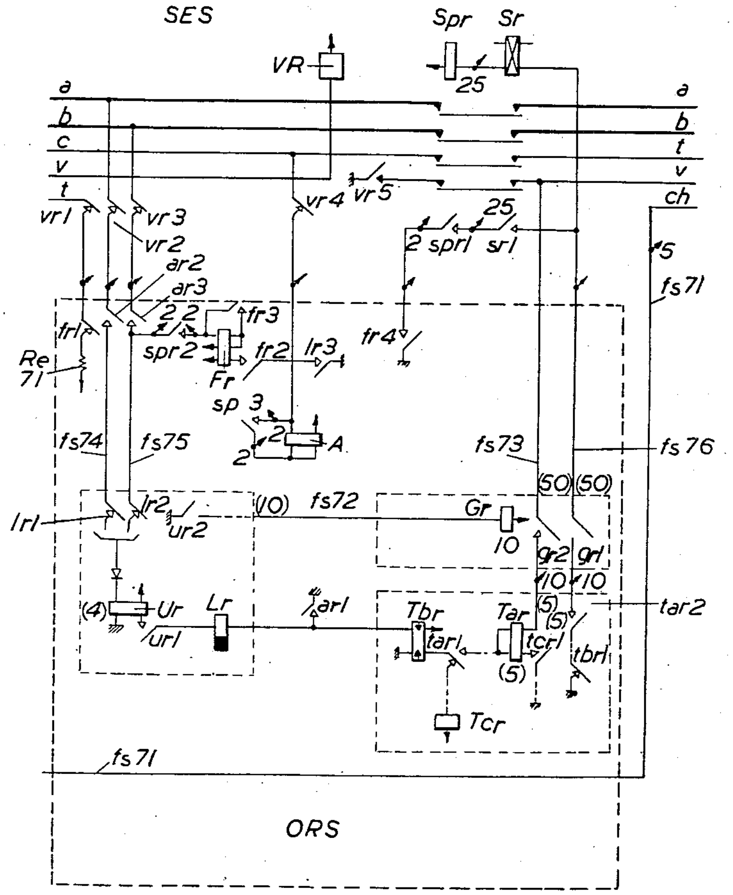

Fig. 7 shows the circuit elements of a second selector and of the associated director.

Figure 8:
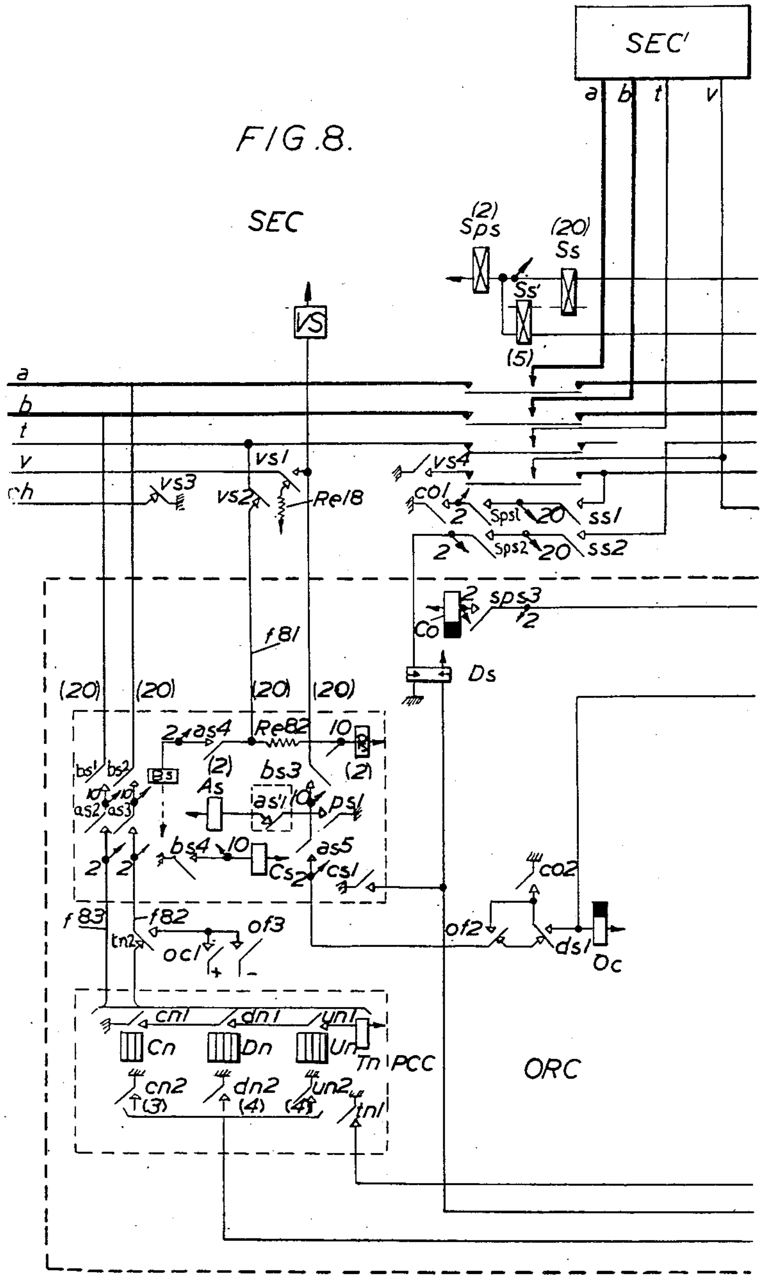
Figure 8A:
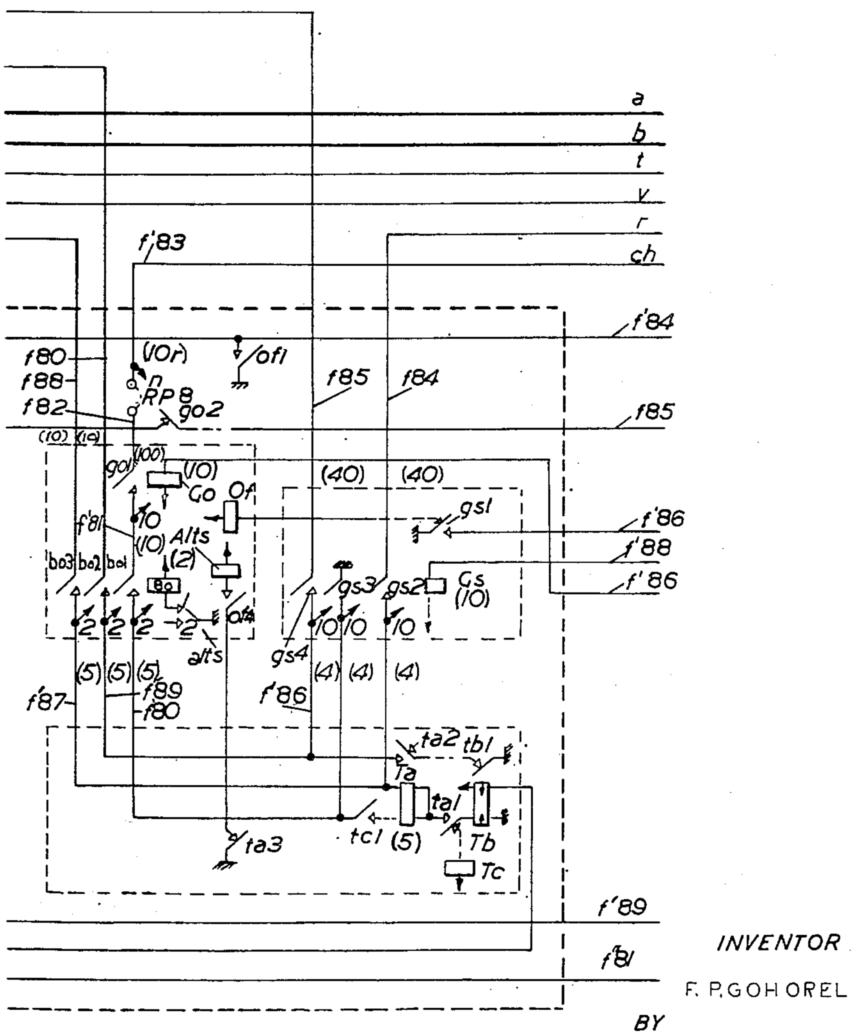

Figs. 8 and 8*a* show the circuit elements of a fifties selector, of the associated director and of a cooperating selector.

Figure 9:
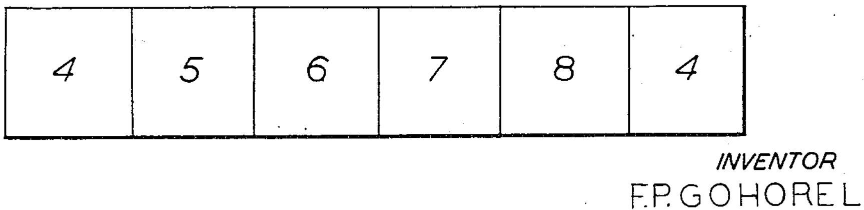

Fig. 9 shows the manner in which Figs. 4 to 9 should be read together.

The wiring diagram of Fig. 1 will be discussed first. It will be assumed hereinafter that all the switches used as finders and as selectors are crossbar switches or multi-connectors of a well-known type comprising a certain number of selecting bars. Each bar is associated with two selecting electromagnets and may assume two operated positions depending on the magnet that is energized. In one of these positions, said bar prepares the circuit for the connection of two lines to two series of connecting bars. The choice of one of these two series is dependent on which of two positions is occupied by a supplementary selecting bar, according to a well-known principle. In the example described, there are provided 13 selecting bars (without counting the supplementary bar), i. e., 26 selection magnets. Two series of 26 lines each, or a total of 52 lines are thus obtained. The choice of the series is made by one of the two magnets associated with the supplementary bar, while the choice of the line in the series is effected by one of the above 26 selecting magnets. Out of these 52 lines, 50 are used for the normal routing of calls, the last two being reserved for testing or any other desired purpose. No mention will be made of these last two lines in the detail drawings, and only 25 of the 26 selecting magnets will be shown.

The only purpose of the selecting magnets is to prepare the circuit for the connection of an individual switch to a line, said connection being caused by a control magnet individual to each individual switch. The connection is held as long as the control magnet remains operated.

It should be understood that it is not necessary to use the supplementary selecting bar for choosing a series of lines. Under such conditions, only one out of 26 lines will be selected, but each line will have twice the number of wires (10 instead of the 5 wires of the example described).

Figure 1:
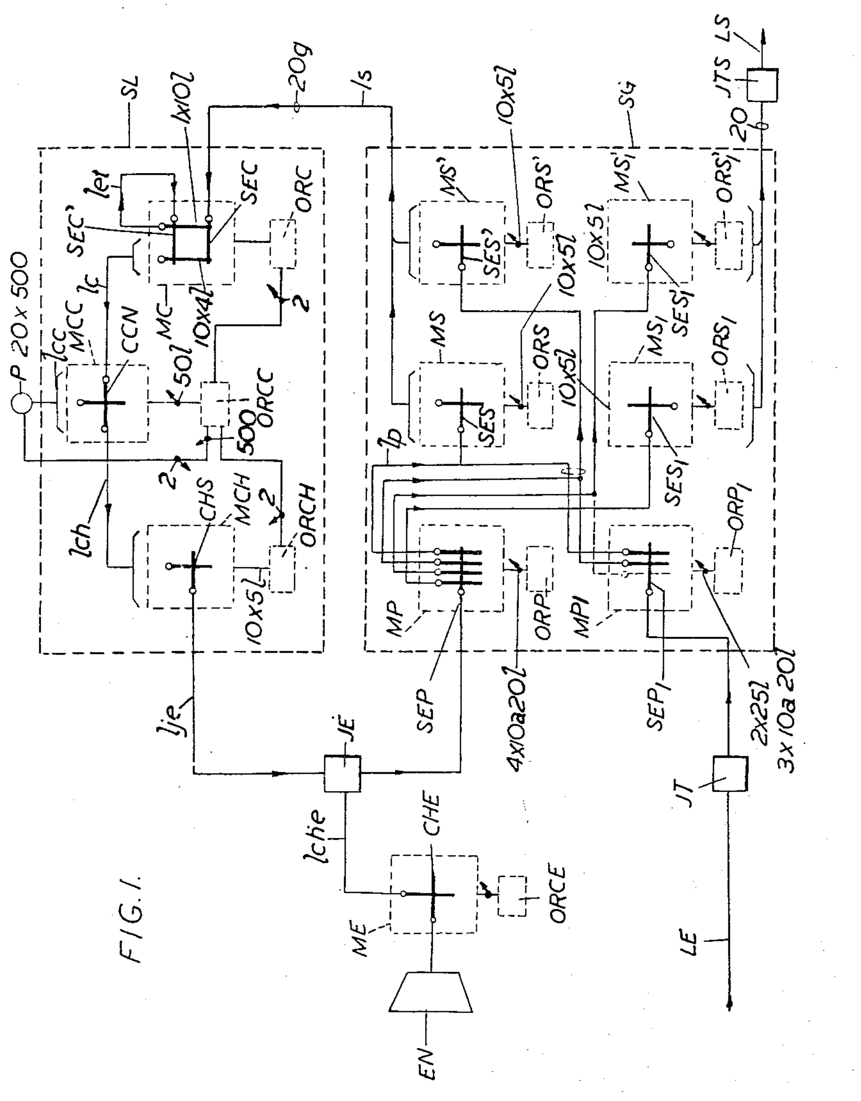
Fig. 1 is a wiring diagram showing the overall operation of the system.

In Fig. 1 these multi-connectors are shown schematically by means of mutually perpendicular heavy lines enclosed within dashed-line blocks. Each horizontal line represents an individual switch having access to a certain number of outgoing lines (26 or 52 depending on the case), and each outgoing line is represented by a vertical line. The various individual switches in a multi-connector give access to the same outgoing lines, that is, they constitute one and the same "set" of switches. In certain cases (second selectors, for instance), the individual swtiches of several multi-connectors are grouped so as to make up a set.

The exchange represented by Fig. 1 has 10,000 subscribers divided into 20 groups of 500 each. An assembly of multi-connectors or "group-selection assembly" SG is used for selecting one out of the 20 groups provided in the exchange; 20 multi-connector assemblies or "line-selection assemblies" SL are used, each capable of selecting one out of 500 subscribers making up a group.

Group-selecting assembly SG comprises, to begin with, a first multi-connector MP. Each individual switch SEP of first multi-connector MP is associated with a register link JE having access to register EN through multi-connector ME.

The twenty selectors SEP making up multi-connector MP give access in common to 50 lines which are distributed among 4 groups that may be made up of 10 to 20 lines each. It may be assumed, for example, that one group has 20 lines and that the other three groups are of 10 lines each.

Two of these groups are associated each with a group of 5,000 local subscribers and give access to selectors SES and SES′ of multi-connectors MS and MS′, respectively; the other two groups, which are associated with distant exchanges, give access to selectors SES1 and SES′1 of multi-connectors MS1 and MS′1, respectively.

The 20 SES selectors making up multi-connector MS give access in common to 50 lines, comprising 10 groups of 5 lines each, giving access to line-selection assemblies SL.

Multi-connector MS′ is made up in the same manner. Multi-connectors MS1 and MS′1 also give access to 10 groups of 5 lines each terminating in a distant exchange.

From the foregoing it follows that the combination formed by multi-connectors MP and MS makes possible the selection of one from among $2 \times 10 = 20$ local groups, and one from among 20 outgoing-line groups. The ten SEC selectors making up the multi-connector MC give access in common to 50 lines made up of 10 groups of 4 lines each and 1 group of 10 lines. Each of the first 10 groups corresponds to fifty subscribers and gives access to a finder-connector CCN of a multi-connector MCC; the 10-line or overflow group is used in the event the multi-connector MC under consideration does not have access to any available finder-connector; through a connection let it gives access to another fifties selector SEC′ (belonging to a different multi-connector MC), through which at least one available finder-connector can be reached.

The 10 finder-connectors CCN of multi-connector MCC give access in common to 50 lines, each associated with one subscriber. Finder-connectors CCN are also used as calling-line or first finders. They can be reached through second finders CHS that make up multi-connector MCH; each finder CHS gives access to 50 lines divided into 10 groups of 5 lines each. The assembly made up by multi-connectors MCH and MCC thus makes it possible to find one from among $10 \times 50 = 500$ lines. Each second finder CHS is associated with a transmission link JE. This link may comprise facilities for supplying current to the calling and the called subscribers and for holding operated the various members used in establishing a connection.

A call coming from a distant office is received over an incoming line such as LE, associated with a link JT. Each link JT gives access to a selector SEP1 of a multi-connector MP1.

If the exchange under consideration does not handle through calls, multi-connector MP1 gives access to two groups of local lines, which may also be reached from multi-connector MP, each group comprising 25 lines.

If the exchange considered handles through calls, multi-connector MP1 comprises a third group of lines connected to outgoing-line selectors SES'1. In Fig. 1, this third group is represented by means of a dashed line. The number of lines in each of the three groups may vary from 10 to 20.

The process involved in the routing of a call will now be explained. When a subscriber P lifts his receiver, the call is received over the two directors ORCC which serve in common the 500 subscribers in the group. Each of these two directors registers, on the one hand, an indication characterizing the level of the subscriber in the fifties sub-group and, on the other hand, an indication characterizing the fifties sub-group within the 500-subscriber group. These directors prepare the circuits, on the one hand, for the connection of a finder-connector CCN in one multi-connector MCC to the calling line, and on the other hand, for causing the seizure of an available second director ORCH. Thereupon, the directors transmit, each through a second director ORCH, the indication characterizing the level of the fifties sub-group in the 500-subscriber group.

The second director ORCH then starts hunting for a second finder CHS associated with an available link JE and for a line *lch* terminating in an available finder-connector CCN of the calling fifties sub-group. Thereupon director ORCH connects second finder CHS to line *lch* and connects finder CCN to calling subscriber P. Arrangements may be provided so that the hunting for a second finder associated with an available link will take place before any call is made (prior pre-selection).

Third director ORCE hunts, on the one hand, for an individual switch CHE associated with an available register EN and, on the other hand, for the line *lche* terminating in the calling link JE. The calling subscriber P is then physically connected to the register EN through the following circuit: subscriber P, line *lcc*, finder-connector CCN, line *lch*, second finder CHS, line *lje*, register link JE, line *lche*, finder CHE and register EN.

It will be noted that the two finder-connector directors ORCC have each routed the call to a different register. However, arrangements are provided so that there will not be any duplicate connection and so that only one of the two chains of members wil remain built up.

The register then sends to subscriber P a control signal indicating to him that he may proceed to dial the number of the called subscriber. The register receives the five digits dialed and retransmits the translated digits required for selection purposes in the selection stages (it will be assumed that a local call is involved). From the foregoing description it follows that the first translated digit intended to direct the first selector must indicate whether the first or the second group of 5,000 subscribers is wanted; the second translated digit, used to direct the second selector, must indicate the level of the 500-subscriber group in the above group of 5,000 subscribers already selected; the next three digits, which are used to select the subscriber line from among the lines in the 500-group, are not translated but rather are sent directly to directors in the last two stages of selection.

The various translated digits are emitted by register EN in the form of coded signals made up of combinations of pulsating currents of given polarity or of alternating currents. These signals are sent out repeatedly until they have been effectively registered in each of the directors, in the manner described in French Patent No. 1,022,151, issued to G. J. M. Penet on December 12, 1952.

The said two translated digits are received by first director ORP. This arrangement has been made bearing in mind that the first selector SEP must not only hunt for an available second selector SES in the dialed 5000-subscriber group, but must also hunt for a second selector having access to at least 1 free line in the dialed 500-subscriber group.

Director ORP prepares the circuit for the connection of first selector SEP to a line *lp* available in the dialed group, and then sends the second translated digit to the second director ORS, which prepares the circuit for the connection of second selector SES to a free line *ls* corresponding to the 500-line group dialed. First director ORP thereupon connects first selector SEP to line *lp* and second selector SES to line *ls*.

The register then sends out the hundreds, tens and units digits of the called-subscriber number, as received. The digits are first received at director ORC, then repeated to director ORCC. These two directors, working together, direct the last two selectors. For this purpose they are provided with the necessary translation facilities.

Director ORC thereupon proceeds to hunt for an available line *lc* corresponding to the wanted fifties sub-group. Next, director ORCC prepares the circuit for the connection of finder-connector MCC to the called subscriber P. Director ORC then causes selector SEC to be connected to line *lc* and finder-connector CCN to subscriber P.

Link JE is thus connected to subscriber P over the following circuit: link JE, first selector SEP, line *lp*, second selector SES, line *ls*, fifties selector SEC, line *lc*, finder-connector CCN, line *lcc*, called subscriber P. The ringing current is sent to the called subscriber in the usual manner, and as soon as the latter lifts his receiver the connection is established. Facilities have been provided in link JE to indicate when the subscribers hang up their receivers as well as to control the various operations involved in breaking down a connection.

If the subscriber happens to be busy, arrangements are provided for sending a suitable signal from director ORC to link JE and register EN, in a well-known manner; all members seized are released, with the exception of the equipment associated with the calling subscriber line, which transmits the busy signal to said calling subscriber.

When all the lines *lc* of the fifties sub-group dialed are busy, director ORC hunts for a line *let* associated with an overflow group and terminating in an available fifties selector SEC' in another multi-connector MC. Arrangements have been provided so that said selector SEC' can be seized only when SEC' gives access to at least one free line *lc* in the desired fifties sub-group. These arrangements have made it necessary to register the last three digits in director ORC.

If the number dialed by the calling subscriber is that of a distant office, director ORP receives a translated digit which serves to prepare the circuit for the connection of first selector SEP to either of second selectors SES1 and SES'1 that handle outgoing calls. The operation of the assembly made up of selectors SEP and SES1 is identical with that already described for the case of a local connection. A call coming from an exchange up the line is received over an incoming line LE associated with a link JT. Said link JT is in turn associated with an incoming first selector SEP1. The operation of the assembly making up the first incoming selector SEP1 and one of the second selectors MS1 is identical with that already described.

Arrangements have been made in the line-selection assembly SL for associating with a given call sign one or more subscriber lines that may occupy any positions whatever on the banks of multi-connectors MC and MCC. These arrangements offer a particularly advantageous flexibility in the case of subscribers having several telephone numbers.

Figure 2:
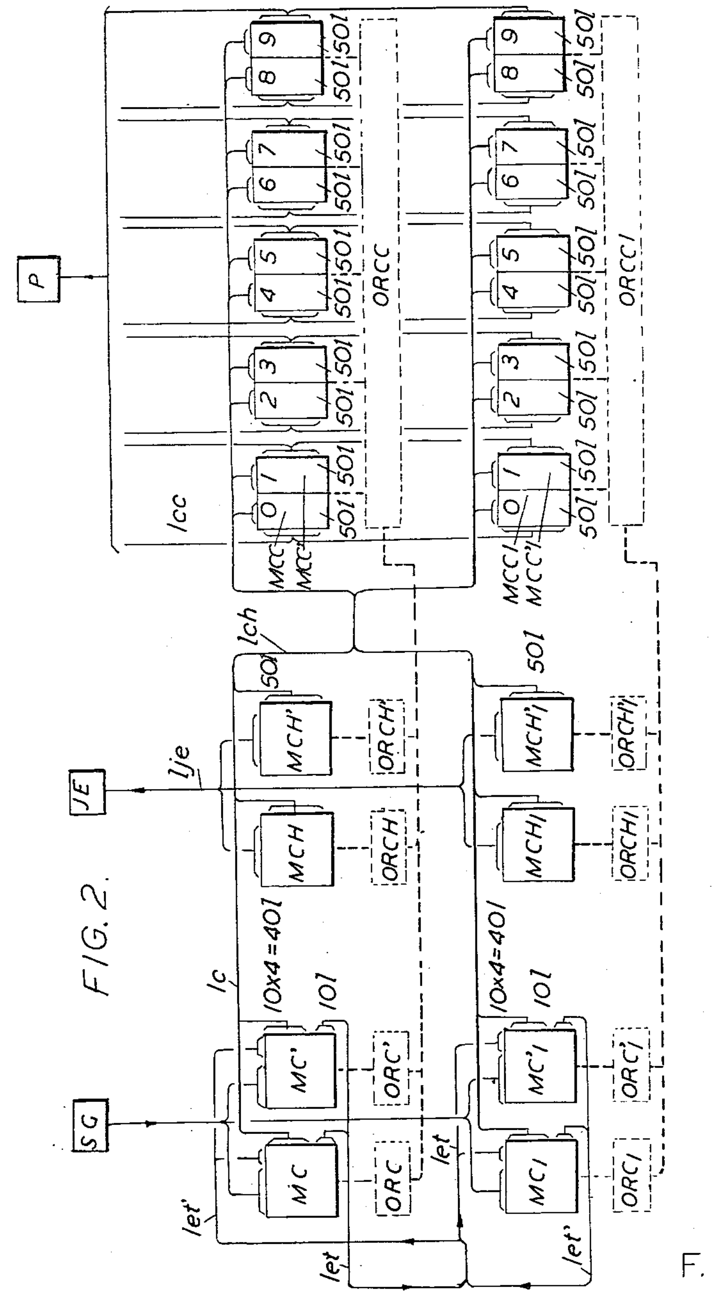
Fig. 2 is another diagram showing the arrangement of the various elements used in the selection of one of 500 subscribers making up one group.
Figure 3:
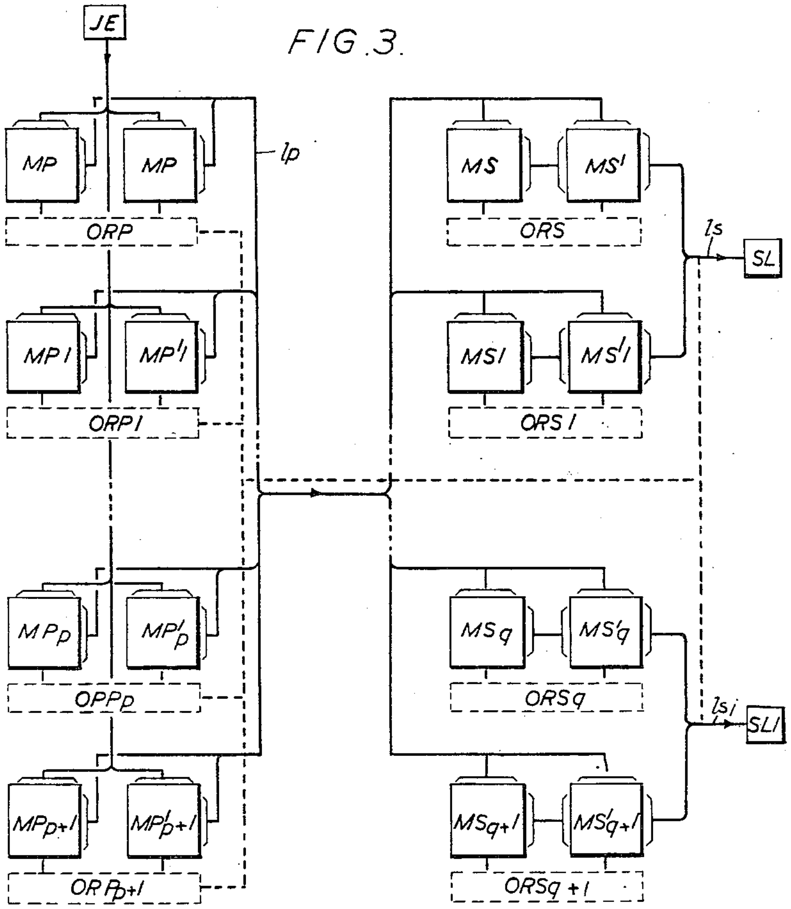
Fig. 3 is a third diagram showing the arrangement of the various elements used in the selection of a 500-subscriber group in an exchange.

The way the selectors and directors are arranged will now be described in connection with Figures 2 and 3. Figure 2 shows all the members that are individual to each group of 500 subscribers. The first 50 lines of the group, namely, the fifties sub-group O, are served, on the one hand, by a multi-connector MCC and on the other hand by a multi-connector MCC1; the next fifty lines, i. e., fifties sub-group 1, are served by multi-connectors MCC1 and MCC'1. Fifties sub-groups 2 to 9 are served in a similar fashion. A first director ORCC is associated with multi-connectors MCC, MCC' . . . and a second director ORCC' is associated with multi-connectors MCC1, MCC'1 . . .

Multi-connectors MCC, MCC' . . . MCC1, MCC'1 . . . are associated in pairs. Their selecting bars are mechanically coupled and the same selecting magnets may be used for either multi-connector. A 50-line group *lcc* is shown, which terminates at 50 subscribers P.

The 500 subscribers of the group are served by 4 second multi-connectors MCH, MCH', MCH1 and MCH'1, associated with directors ORCH, ORCH', ORCH1 and ORCH'1, respectively. The first two directors ORCH and ORCH' are associated with director ORCC, while the other two directors ORCH1 and ORCH'1 are associated with director ORCC1. Multi-connectors MCH, MCH', MCH1 and MCH'1 all serve the same set of lines, i. e., they give access to the same outgoing lines. As follows from the description of Fig. 1, multi-connector MCH gives access to 10 groups of 5 lines each, with each line in a given group being connected to a finder-connector of a multi-connector MCC. The number of finder-connectors serving a given fifties sub-group 0 varies with the traffic handled by the exchange and may be as high as 20, that is, 10 finder-connectors in multi-connector MCC and 10 connecting finders in multi-connector MCC1. The first 5 finder-connectors of multi-connector MCC are connected to the banks of the multi-connector MCH, while the last five are connected to the banks of multi-connector MCH'. The first 5 finder-connectors of multi-connector MCC1 are connected to the banks of multi-connector MCH1, while the last 5 are connected to the banks of multi-connector MCH'1. The finder-connectors associated with the other fifties sub-groups are connected in a similar manner to the banks of multi-connectors MCH, MCH1, MCH' and MCH'1.

The incoming lines *lje* of multi-connectors MCH are each associated with a register link JE.

The fifties selectors serving the 500-subscriber groups make up 4 multi-connectors MC, MC', MC1 and MC'1, associated with directors ORC, ORC', ORC1 and ORC'1, respectively. The two first directors, ORC and ORC', are associated with director ORCC; the other two, ORC1 and ORC'1, are associated with director ORCC1. Multi-connectors MC, MC', MC1 and MC'1 comprise 20 fifties selectors each and serve the same set of lines, i. e., give access to the same outgoing lines *lc*. As follows from the description of Fig. 1, multi-connector MC gives access to 10 groups of four *lc* lines each and to 1 group of 10 co-operating lines *let*. Each line *lc* of the normal group is connected to one finder-connector in a multi-connector MCC. The first four finder-connectors of multi-connector MCC are connected to the banks of multi-connector MC; the next four finder-connectors of multi-connector MCC are connected to the banks of multi-connector MC'; the last two finder-connectors of multi-connector MCC and the first two connecting finders of multi-connector MMC1 are connected to the banks of multi-connector MC1; the next four finder-connectors of multi-connector MMC1 are connected to the banks of multi-connector MC'1; and lastly, the last four finder-connectors of multi-connector MCC1, if required to handle the traffic, are connected to the banks of a multi-connector MC, not shown. The finder-connectors associated with the other fifties sub-groups are connected in a similar manner to the banks of multi-connectors such as MC, MC' . . .

Then 10 lines *let* of the cooperating group coming out from multi-connectors MC, MC' are connected to the last five fifties selectors of multi-connectors MC1, MC'1; similarly, the 10 lines *let'* of the cooperating group coming out from multi-connectors MC1, MC'1 are connected to the last five fifties selectors of multi-connectors MC, MC'.

The first selectors are grouped in multi-connectors MP (Fig. 3), MP1 . . . $MP_p$, $MP_{p+1}$ . . . MP', MP'1 . . . $MP'_{p'}$, $MP'_{p+1}$ . . .

Each multi-connector such as MP comprises 20 first selectors, with one director ORP serving two multi-connectors MP, MP'.

Each multi-connector MP serves one and the same set of outgoing lines *lp*, while one director ORP serves two sets of outgoing lines. Each of the MP multi-connector selectors is connected to a register link JE.

The second selectors are grouped under multi-connectors MS, MS1 . . . $MS_q$, $MS_{q+1}$ . . . MS', MS'1 . . . $MS'_q$, $MS'_{q+1}$. . . Each multi-connector MS comprises 20 second selectors, with one and the same director ORS handling 2 multi-connectors MS and MS'. Multi-connectors MS and MS' associated with director ORS serve only one set of outgoing lines *ls*. Outgoing lines *ls* terminate in line-selecting elements SL, SL1.

First selectors SEP and second selectors SES constitute an arrangement known as "double selector." In other words, the two stages of selection SEP and SES, each of which selects one line from among 50, make up an assembly that performs the same function as a single 2500-line switch. To obtain this result, any first selector SEP whatever is connected to second selectors each having access to different lines, in so far as is possible. Therefore, each first selector may have access, through 50 second selectors, to 50×50=2,500 different lines. Further, arrangements are made so that a first selector SEP can select only a second selector that is not only available but also has access to at least one free line in the group corresponding to the number dialed.

An embodiment example in connection with Figs. 4 to 8, and a detailed description of the operations involved in the routing of a local call, will now be given.

In the following description, the contacts associated with relays or magnets are denoted by the same letter or group of letters as the relays or magnets, but followed by a numeral 1 to 9. Lower-case letters only are used to designate said contacts.

In the schematic drawings of Figs. 4 to 8, only those circuit elements necessary to make the invention understandable are shown. For instance, certain relay assemblies are mounted "chain"-like, that is, they are arranged so that they cannot be energized at the same time; the details of these chain circuits are not shown.

For the sake of simplifying the drawings, similar members or circuits are not all shown, but rather one member or circuit of each kind, the actual number of members or circuits of that kind being indicated in parentheses. For example, although there are five test relays, only one of them is shown.

The individual members (finders, selectors) are separated from the common members (directors) by means of heavy dashed lines, and, within each director, member assemblies having similar functions (group selection, test) are included within the light dashed-line blocks.

When the calling subscriber lifts his receiver, the following circuit is completed: battery, upper winding of relay A, which becomes energized, back contact *c2*, loop of calling subscriber P, back contact *c1* and ground. Through its front contact *a3*, relay A prepares the circuit of relay P*d* of director ORCC; through its front contact *a4* it prepares a circuit for a similar relay P*d*, a second director ORCC'1 serving the group of 500 subscribers; through its front contact *a5* it completes the following circuit: ground, front contact *a*5, back contact *c*5, wire *ft*1 multipled on the two directors ORCC serving the group of 500 subscribers in which the calling subscriber is included, back contact *cd*1, relay M, which becomes energized, and battery. It will be noted that director ORCC serves all the 500 subscribers in the group. Therefore, wire *ft*3 is multipled on the wires *ft*2 each associated with a given subscriber.

Through its front contact *m*1, relay M completes the circuit of relay K*c*. The circuit of relay K*c* by-passes contacts (not shown) that open when director ORCC is used to route a call to a called subscriber belonging to the group of 500 under consideration.

It will be assumed in the description that follows that director ORCC is available when the subscriber lifts his receiver, and that relays K*c* becomes energized.

Through its front contact *kc*1, relay K*c* completes the following circuit: ground, front contact *kc*1, wire *ft*4 multipled on the 500 subscribers of the group, wire *ft*5, which is individual to the calling subscriber, front contact *a*3, back contact *c*3, wire *ap*, which is individual to the calling subscriber, resistance R*e*41, relay P*d*, and battery.

The subscribers of half a fifties sub-group have their wires *ap* multipled on the same relay P*d*. The number 20, shown in parantheses alongside relay P*d*, means that there are 20 similar relays in the director ORCC under consideration. Through its front contact *kc*2, relay K*c* prepares the circuit of relay G*c* of second director ORCH. Through its front contact *kc*3 it prepares the circuit of a relay similar to G*c* in the other director ORCH associated with director ORCC.

Relay P*d*, through its front contact *pd*1, prepares a circuit for relay A*d*; through its front contact *pd*2 it completes the following circuit: ground, back contact *vf*4, front contact *pd*2, front contact *kc*2, relay G*c*, which becomes energized, and battery. The two contacts *pd*2 corresponding to the two halves of a fifties sub-group of one multi-connector are connected to one and the same with *ft*6, which terminates in relay G*c*; as a result, relay G*c* characterizes the calling fifties sub-group. Through its front contact *pd*3, relay P*d* causes a relay similar to G*c* in the second director ORCH to be energized. Relay G*c* through its front contact *gc*1 prepares a circuit for relay A*d*; through its front contact *gc*2 it prepares a circuit for one of the test relays T*ac*; through its front contact *gc*3 it completes the following circuit: ground, front contact *gc*3, back contact *tcc'*6, associated with relay T*cc* of the second ORCH director associated with the director ORCC considered, relay T*cc*, and battery. The 10 *gc*3 contacts corresponding to the 10 fifties sub-groups of the group of 500 are multipled on the same wire *fc*1; relay T*cc*, which is connected to this wire, is therefore the only one energized in director ORCH. The T*cc* relays of each of the second directors ORCH associated with the director ORCC under consideration have their circuits completed at the same time; one of them, being faster than the other, becomes energized and opens the circuit of the relay T*cc* of the other director. In the example described it will be assumed that relay T*cc* of the director ORCH under consideration becomes energized; through its front contact *gc*4, relay G*c* prepares a circuit for selecting magnets S*c* and S*pc*. The energized relay G*c*, which characterizes the calling fifties sub-group, has five *gc*2 contacts; each of these five contacts terminates in a different T*ac* relay. There are, consequently, five T*ac* relays in the director of second finder ORCH. Each of the five T*ac* relays is multipled on 10 *gc*2 contacts belonging to 10 different G*c* relays. There are thus obtained 50 wires such as *fc*2, each corresponding to one of the lines coming out from the second finder.

The five T*ac* relays have their circuits completed at the same time as follows: ground, front contact *tcc*1, relay T*ac*, front contact *gc*2 of the relay G*c* associated with the calling fifties sub-group, wire *r*, back contact *vf*3 associated with magnet VF, resistance R*e*42, and battery. The finder-connectors that are available have their *vf*3 contacts closed and the corresponding T*ac* relays have their circuits completed. One of the relays, which is faster than the others, becomes energized and opens the circuits of identical relays through contacts not shown. Through its contact *tcc*2, relay T*cc* completes the circuit of the upper winding of relay T*bc*, which becomes energized; through its front contact *tcc*3, relay T*cc* prepares a circuit for relay C*oc*; through its front contact *tcc*4, it completes the circuit of the right-hand winding of relay D*sc*, which is energized; through its front contact *tcc*5 and through front contact *gc*1, it places a ground on wire *ft*7 of director ORCC for a purpose that will be explained hereinafter. Relay T*ac*, through its front contact *tac*1, shunts the low-resistance lower winding of relay T*bc* across its own high-resistance lower winding, so as to bring down the test potential on wire *fc*2 and to mark the busy condition on the selected connecting finder; the flux produced in the lower winding of T*bc* opposes the flux through the upper winding, and said relay releases, assuming, however, that the selected connecting finder has been chosen only by the ORCH director under consideration; through its front contact *tac*2, it prepares a circuit for the selecting magnets S*c* and S*pc* of the second finder.

Relay T*bc* completes through *tbc*1 the following circuit: ground, back contact *tbc*1, front contact *tac*2 corresponding to the energized T*ac* relay, front contact *gc*4 corresponding to the energized G*c* relay, lower winding of selecting magnet S*c*, winding of selecting magnet S*pc*, and battery. Contact *tbc*1, which is the sole contact for director ORCH, is multipled on five *tac*2 contacts associated with five T*ac* relays, respectively. Each *tac*2 contact is in turn multipled on 10 *gc*4 contacts associated with 10 G*c* relays, respectively. At the outlet of director ORCH there are thus obtained 50 *fc*3 wires, each corresponding to an outgoing line in second finder CHS. The two *fc*3 wires corresponding to two lines occupying the same level in the two halves of a fifties sub-group, terminate in the same selecting magnet S*c*, one in the upper winding and the other in the lower winding. The 25 *fc*3 wires coming out from the lower windings of the 25 S*c* magnets, and which correspond to the 25 lines in a half fifties sub-group, terminate in the same selecting magnet S*pc*; the other 25 *fc*3 wires corresponding to the 25 wires in the other half fifties sub-group, terminate in another selecting magnet S*pc*, not shown. In the case under consideration, an S*pc* magnet is energized to select the half fifties sub-group and an S*c* magnet to select the line within the half fifties sub-group.

Through their front contacts *spc*2 and *sc*2, selecting magnets S*pc* and S*c* prepare a double test circuit for the calling subscriber; through their front contacts *spc*1 and *sc*1, these magnets prepare an energizing circuit for control magnet VF.

As has been indicated, a ground is placed on wire *ft*7 of director ORCC over contacts *tcc*5 and *gc*1. The following circuit is then completed: ground, front contact *tcc*5, front contact *gc*1, front contact *pd*1, back contact *ad'*1 of relay A*d*, which becomes energized, and battery. Wire *ft*7, which is the sole wire for director ORCC, is multipled on the two *pd*1 contacts associated with the two P*d* relays characterizing the two halves of the fifties sub-group, respectively; relay A*d*, connected to the closed contact *pd*1 therefore characterizes the calling half fifties sub-group. Back contact *ad'*1 is associated with relay A*d*, which characterizes the other half fifties sub-group, and has been provided to prevent the simultaneous energization of the relays corresponding to the two halves of the same fifties sub-group.

Through its front contact *ad*2, relay A*d* prepares a circuit for one of the two selecting magnets S*pf*. The 25 *ft*8 wires of the calling half fifties sub-group are each connected to a contact *ad*3 associated with the same A*d* relay. Each A*d* relay therefore comprises 25 contacts similar to *ad*3.

Multi-connector MCC (Fig. 2) comprises 25 S*f* and 2 S*pf* selecting magnets. Each of the 25 S*f* selecting magnets characterizes the level of a subscriber in each of the half fifties sub-groups, while each of the 2 S*pf* magnets characterizes the level of one half-fifties within the fifties sub-group. All these magnets do is to effect one selection, the connection of the finder-connector to the calling line being caused by the control magnet VF individual to each finder-connector. Arrangements have been provided to obtain a mechanical coupling between the selecting bars of the multi-connectors MCC and MCC′ serving two adjacent fifties sub-groups (Fig. 2). Consequently, the same sets of selecting magnets S*f* and S*pf* are used for both of these multi-connectors.

The four *ad*3 contacts associated with the four subscribers occupying the same level in the half fifties sub-groups of adjacent multi-connectors MCC and MCC′, respectively, are connected to one and the same magnet S*f*. From the moment relay A*d*, which characterizes the calling half fifties sub-group, operates, the following circuit is completed: ground, front *kc*1, wires *ft*4 and *ft*5, front *a*3, back *c*3, wire *ft*8, front *ad*3 associated with the calling line, wire *ft*9 characterizing the level of subscriber in the calling half fifties sub-group, magnet S*f*, back *sf*1, resistance R*e*43, and battery. Magnet S*f*, which characterizes the level of the subscriber in the calling half fifties sub-group, operates and completes through its front contact *sf*1 the following circuit: battery, relay E*d*, front *sf*1, magnet S*f* and the circuit already described. Two relays, such as E*d*, have been provided in director ORCC; the first of these relays is associated with the subscribers of one of the half fifties sub-groups of multi-connectors MCC, MCC′ . . ., while the other is associated with the subscribers of the other half fifties sub-group of multi-connectors MCC, MCC′ . . . Arrangements, not shown in this figure, have been provided to cause the operation of that one of the two relays E*d* that corresponds to the calling half fifties sub-group.

Relay E*d*, through its front contact *ed*1, completes the following circuit: ground, front *ed*1 and *ad*2, selecting magnet S*pf*, battery. Multi-connectors MCC and MCC′, which serve adjacent half fifties sub-groups, have their selecting bars ganged, and therefore the same set of selecting magnets S*pf* is used for both of them; an S*pf* magnet can be energized either through the *ad*2 contact of one of the half fifties sub-groups of multi-connector MCC or through the *ad*2 contact of the same half fifties sub-group in multi-connector MCC′.

Magnet S*pf* prepares a circuit for the connection of finder-connector CCN to a line in the calling half fifties sub-group.

It will be assumed throughout the following discussion that one of the 20 second finders CHS of the second multi-connector is associated with an available link JE capable of giving access to at least one available register EN.

Director ORCH comprises five U*a* relays and four G*a* relays, which allow obtaining 4×5=20 different combinations, each of these combinations corresponding to a second finder CHS. It will be assumed that the finder CHS shown in Fig. 5 is connected to link JE of this same figure. The two relays, U*a* and G*a*, characterizing this finder are therefore operated.

Magnet S*pf* (Fig. 4) completes the following circuit through its front contact *spf*1: ground, front *spf*1, wire *ft*10 individual to director ORCC and leading into the second finder ORCH engaged, wire *ft*10, front *tcc*3, back *spc*3 of the energized S*pc* magnet, front *ua*3 of the energized U*a* magnet, relay C*oc*, battery. As can be seen from Fig. 5, the *spc*3 contacts are connected in parallel, and the five *ua*3 contacts are likewise connected in parallel. Circuit portions *ft*10, *tcc*3, *fc*4 and C*oc* are associated solely with second director ORCH.

Through its front contact *coc*1, relay C*oc* completes the following circuit: ground, front *coc*1 and *spc*1 of the energized S*pc* magnet, and *sc*1 of energized magnet S*c*, wire *v*, controls magnet VF of connecting finder CCN, battery; through its front contact *coc*2, it causes the energization of relay C*d*; through its front contact *coc*3 it completes a holding circuit for the right-hand winding of relay D*sc*; and through its front contact *coc*4 it prepares an operating circuit for control magnet VC of the second finder CHS.

Magnet VF connects the four wires, *a*, *b*, *t* and *c*, of finder-connectors CCN to wires *a*, *b*, *t* and *c* of the calling subscriber previously selected by the combination of a selecting magnet S*f* and a selecting magnet S*pf*. The following two circuits are thus completed: battery, windings in series of relays C and A, wire *t*, resistance R*e*44, front *vf*5, ground; in parallel with this circuit, wire *t*, front *sc*2 of energized magnet S*c*, *spc*2 of energized S*pc*, left-hand winding of relay D*sc*, ground. Relay A is held by its lower winding, relay C operates and relay D*sc* releases, the flux in the two windings being equal and of opposite polarity, assuming that the director under consideration is the only one that tests the calling subscriber line.

Magnet VF, through the opening of its back contact *vf*3, confirms the busy condition of finder-connector CCN.

Relay C, at its back contacts *c*1 and *c*2, shorts out the upper winding of relay A; at its back contact *c*3 it opens the circuit of relay P*d*; at its back contact *c*4 it opens the circuit of relay P*d* in the second director; at its back contact *c*5 it opens the circuit of relay M, which, being slow-acting, releases after a certain amount of time has elapsed.

At its back contact *dsc*1, relay D*sc* completes the following circuit: ground, front *coc*4, back *dsc*1, front *ua*1 of the energized U*a* relay, front *ga*1 of the energized G*a* relay, control electrode VC of second finder CHS, battery.

Magnet VC causes the connection of wires *a*, *b*, *c* and *v* of second finder CHS to the wires *a*, *b*, *c* and *v* of the CNN finder-connector selected.

The following circuit is then completed: battery, relay L*a*, which is energized, back *ca*2, upper line-wire *a*, through the second finder CHS and connecting finder CCN, loop of subscriber P, wire *b*, through finders CNN and CHS, back *ca*3, ground.

At its front contact *vc*1, relay VC completes for itself a holding circuit in parallel with magnet VF.

Relay P*d*, upon releasing, causes the release of directors ORCC and ORCH. At contact *pd*1, it opens the circuit of relay A*d*, which releases; at *pd*2 it opens the circuit of relay G*c*, which also releases; and at *pd*3 it causes the same thing to happen in the other second director.

At its front contact *ad*2, relay A*d* causes the release of magnet S*pf*; at its front contact *ad*3 it causes the release of magnet S*f*.

Magnet S*f*, at front contact *sf*1, opens the circuit of relay E*d*, which releases.

Magnet S*pf*, at front contact *spf*1, opens the circuit of relay C*oc*, which releases after a short time.

At front contact *m*1, relay M opens the circuit of relay K*c*.

In the second director ORCH (Fig. 5), relay G*c* opens through its front contact *gc*2 the circuit of relay T*ac*, which releases; at front contact *gc*3 it opens the circuit of relay T*cc*, which likewise releases; and at front contact *gc*4 it opens the circuits of magnets S*c* and S*pc*.

Magnets S*c* and S*pc* open at *sc*1 and *spc*1 the circuit of control magnet VF, but the latter holds over the following circuit: battery, magnet VF, wire *v* through second finder CHS, back contact associated with front contact *ca*4, front *la*2 and back *le*3 in all the available registers accessible through link JE, ground.

Magnet VC holds in parallel with the same circuit.

Relay T*ac* opens at *tac*1 the circuit of the lower winding of relay T*bc*, which releases because *tcc*2 opens its lower winding.

Relay C*oc*, which releases after a certain time, opens at *coc*2 the circuit of relay C*d*, which completes the release of first director ORCC. Directors ORCC and ORCH are then completely released and may be used for the routing of the next call.

Calling subscriber P is then physically connected to link JE, through finder-connector CCN and second finder CHS.

The connection of link JE to an available register EN will now be described.

At its front contact *la*1 and back contact *ca*6, relay L*a* causes pilot relay P*e* to be energized. Director ORCE serves 50 register links such as JE. The 25 *ca*6 contacts of the links associated with the same half fifties sub-group are multipled on the same pilot relay P*e*.

At its front contact *pe*1, relay P*e* energizes relay A*e*. Two A*e* relays have been provided, each characterizing one of two halves of the fifties sub-group of the links. These two A*e* relays mutually cut themselves off through back contact *ae'*4, which makes it impossible for the two A*e* relays to become energized at the same time.

Relay A*e* comprises 8 contacts such as *ae*1, each connected to a T*e* relay which is itself connected to an EN register. In each available EN register, contact *le*2 is unoperated, the following circuit being then completed: ground, front *ae*1, relay T*e*, back *le*2, resistance R*e*52, battery. One of the T*e* relays, which operates faster than the others, opens the circuit of identical relays through contacts not shown.

Relay A*e*, at its front contact *ae*2, prepares the circuit of control magnet VE; at its front contact *ae*3, relay A*e* completes the circuit of selecting magnet S*e*. The two A*e* relays, each associated with one half fifties sub-group of the JE links, comprise 25 front contacts such as *ae*3 each. The *ae*3 contacts corresponding to the two links occupying the same level in the two half fifties sub-groups are multipled in pairs and terminate in the same selecting magnet S*e*.

In the example described, 8 registers are provided, each of which may be associated with two CHE finders. The first of these registers gives access to the first 25 links, while the second gives access to the last 25 links of the fifties sub-group. The choice of a particular CHE finder therefore depends on the one hand on the register that has been selected and on the other hand on the calling half fifties sub-group. Consequently, when the A*e* relay characterizing the calling half fifties sub-group has operated and the T*e* relay characterizing the register selected has become energized, the following circuit is completed: ground, front *se*1 of operated magnet S*e*, front *ae*2, front *te*1 of relay T*e*, magnet VE, battery.

Magnet VE, which operates, characterizes both the register selected and the calling half fifties sub-group; it causes the connection of the corresponding CHE finder to the register link selected by magnet S*e*.

In the case under consideration, 8 connecting wires are provided between the register and the link. The capacity of finder CHE is twice that of the other switches but, on the other hand, it gives access to only 25 lines. This corresponds to the case for which the supplementary selecting bar is not used; there has not been, for the CHE finder considered, a choice of a series of lines, but only the selection of one line from a single series of 25 lines, by the operation of magnet S*e*.

Register EN is connected to the calling JE link, and the following circuit is thereupon completed: battery, left-hand winding of supply relay E*e*, wire *a*1 through finder CHE, line wire *a*, calling subscriber loop through a circuit already described, line wire *b*, wire *b*1 through the finder CHE, right-hand winding through relay E*e*, ground. Relay C*a* is energized over wire *t*1 and front contact *ve*2.

At its front contact *ca*1, relay C*a* completes a holding circuit for itself, as follows: at its front contacts *ca*2 and *ca*3 it opens the circuit of relay L*a*, which releases. Through the operation of contact *ca*4 it continues to ensure the holding of magnets VF and VC; through the opening of its back contact *ca*6, it opens the circuit of relay P*e* and of selecting magnet S*e*.

Relay E*e* causes, at its front contact *ee*1, the operation of relay L*e*.

Relay L*e*, at front contacts *le*1 and *ve*1, completes a holding circuit for magnet VE and at back contact *le*2 opens the circuit of relay T*e*.

At front contact *pe*1, relay P*e* opens the circuit of relay A*e*, which releases.

The combination formed by relays P*e*, A*e*, T*e* and the selecting magnets S*e* is released and may be used for the routing of the next call.

It will be noted that relay L*a* is somewhat slow to release, thus preventing possible chatter in the event of short line interruptions; furthermore, contact *la*1 is sufficiently slow in opening to prevent the premature release of finder CHE and of the various associated members.

The register then sends the dial tone, according to a well-known method, to the calling subscriber, indicating to him that he may go ahead and dial the called subscriber. As the latter dials the called number, relay E*e* beats at the rate of the interruptions produced by the dial and, in a well-known manner, causes the various digits to be registered. The register thereupon transmits over the three wires *a*2, *b*2 and *c*2 the various selection combinations required for routing a call, in the form of a combination of polarities.

The seizure of first selector SEP by register link JE is accomplished by grounding wire *v* (Fig. 5). The following circuit is then completed: ground on wire *v* (Figs. 5 and 6), back *vp*5, resistance R*e*60, pilot relay P*p*, battery. It will be assumed that $10 \times n$ first selectors, such as SEP, are associated with a single first director ORP. In the particular case of Fig. 3, first director ORP is associated with two first multi-connectors MP and MP'; each of these multi-connectors incorporates 20 individual selectors. Director ORP is associated with 40 selectors. In this case, $n=4$.

Contacts *vp*5 (Fig. 6) of the SEP selectors belonging to the same group of 10 are all connected, through a decoupling resistor R*e*60, to the same pilot relay P*p*. Since there are *n* groups of 10 selectors, there is consequently a total of *n* relays P*p* in first director ORP. The operated P*p* relay therefore indicates the group of 10 to which engaged selector SEP belongs. Relay P*p*, at front contact *pp*1, prepares a circuit for relay A*p*; at front contact *pp*2 it completes the following circuit: battery, relay C*p*, front *pp*2 associated with operated relay P*p*, back *lp*3, *hp*3 and *kp*2, ground. The multipling arrows *n* indicate that there are *n* contacts *pp*2 in parallel and associated with *n* different P*p* relays, respectively. Furthermore, contacts *lp*3, *hp*3 and *kp*2 are unoperated only when director ORP is available. Relay C*p* thus indicates by its operation that the director controlling the seized selector SEP is available.

Relay C*p*, at front contact *cp*1, completes the following circuit: battery, front *cp*1, relay A*p*, front *pp*1, ground. As many A*p* relays are provided as there are *pp*1 contacts. Since there are *n* relays P*p*, there are also *n* contacts *pp*1 connected to *n* relays A*p*, respectively. The operated A*p* relay indicates that the engaged selector SEP belongs to the group *n*. It may happen that two SEP selectors associated with the same first director ORP are simultaneously placed in a "calling" condition; in such a case, two relays, such as A*p*, would tend to operate, but this is not possible because the circuit of each of the A*p* relays is opened by the back contacts of all the other A*p* relays. These contacts are not shown, so as not to complicate the drawing.

At front contacts $ap1$, $ap2$ and $ap3$, relay Ap prepares a circuit for the reception of the first translated digit at first director ORP; at front $ap4$ it prepares a circuit for the control magnet VP of selector SEP; at front $ap5$ it completes the following circuit: wire $v$ grounded by register link JE, back $vp5$, front $ap5$ of operated relay $Ap$, relay B$p$, battery. Wire $fp61$ is individual to each of the first selectors SEP associated with director ORP. Since relay P$p$ is common to 10 selectors of the same group, there are 10 contacts such as $ap5$ for each $A$p relay. These contacts are multipled in pairs and terminate in one and the same B$p$ relay. Two multipled $ap5$ contacts belong to the two selectors SEP occupying the same level in two different tens. The operated B$p$ relay thus indicates reliably the level which the calling selector SEP occupies in the tens sub-division. If two selectors belonging to the same tens sub-division but occupying different levels happen to be placed at the same time in a "calling" condition, two B$p$ relays will tend to operate but cannot do so because the circuit of each B$p$ relay passes in series through the back contacts of the other B$p$ relays. Relay A$p$ completes a holding circuit for itself over front contact $ap6$.

The $n$ groups of 10 SEP selectors associated with one ORP director are subdivided into $m$ sets, i. e., into $m$ sub-groups of selectors, all the selectors in one sub-group having access to the same multipled outgoing lines. In the particular case of Fig. 3, each multi-connector MP comprises 20 individual selectors giving access to the same multipled outgoing lines and therefore constituting a set. Director ORP thus controls two sets of selectors, and in this particular case $m=2$.

In Fig. 6 arrangements are provided so that each set of first selectors comprises a whole number of 10-selector groups; in other words, two selectors belonging to the same group of 10 must necessarily form part of one and the same set. The $ap7$ contacts of all the groups belonging to the same set are multipled on one and the same wire $fp62$; since there are $n$ groups of 10 selectors each, there are $n$ $ap7$ contacts, and since there are $m$ sets, there are also $m$ $fp62$ wires. Each $fp62$ wire is connected to a relay E$p$ individually associated with each set. In the case under consideration, the energized A$p$ relay completes through front contact $ap7$ the following circuit: ground, $ap7$ contact individual to the group of the calling selector, wire $fp62$ and relay E$p$ individual to the calling selector set, battery.

At front contact $ep1$, relay E$p$ prepares a holding circuit for selecting magnets SPP and SP; through the same contact it completes the circuit of the upper winding of relay TBP, which operates; it also prepares a holding circuit for the relays (U$p$ and D$p$) that register the first two translated digits; at front contact $ep2$ it prepares an energizing circuit for relay F$p$. Relay T$bp$, at front contact $tbp2$, completes the circuit of relay T$dp$, which becomes energized.

Relay T$dp$, at front contact $tdp1$, completes the following circuit: ground, front $tdp1$, lower winding of relay T$bp$, back $tap1$, relay T$cp$, battery. Five T$ap$ relays have been provided in first director ORP; but, on the other hand, this director has only one T$cp$ relay, the circuit of said T$cp$ relay by-passing the back contacts $tap1$ of the five T$ap$ relays.

Relay T$cp$ has five $tcp1$ contacts, connected to five T$ap$ relays, respectively. At its various $tcp1$ contacts, relay T$cp$ prepares the circuit for the testing of a free line terminating in the second selector SES.

The reception of the various translated digits is effected according to a method described in the aforementioned French Patent 1,022,151. According to this method, each digit is received in the form of a combination of polarities applied to one or more wires; these polarities consist either of positive pulsating current, negative pulsating current or alternating current.

The device for receiving the first translated digit is shown schematically by means of a relay D$p$. Actually, there are two D$p$ relays shunted across the same receiving wire $fp63$. One of these relays is connected to said wire through a rectifier $Rd61$ having the polarity shown in the figure. The second relay is connected to this same wire through a rectifier connected in the opposite direction. When a positive pulsating current is received, i. e., a current flowing in wire $fp63$ in the direction of the arrow, relay D$p$, shown in the figure, is operated; when a negative pulsating current is received, i. e., a current flowing in wire $fp63$ in a direction opposite that of the arrow, the other D$p$ relay (not shown) operates; and when an alternating current is received, the two relays operate. It is therefore possible, by this method, to obtain four different combinations, corresponding to the operation of the first D$p$ relay, to the operation of the second D$p$ relay, to the operation of both D$p$ relays, and to the non-operation of these relays, respectively. In the case of local calls, only two combinations are used for selecting each a group of 5,000 subscribers out of the 10,000 subscribers served by the exchange. The other two combinations are used for outgoing calls.

Following the operation of one $A$p relay and one B$p$ relay, the wire $fp63$ over which the first translated digit is received is connected to engaged selector SEP through a contact $ap3$ characterizing the group with which said selector is associated and through a contact $bp3$ characterizing the level of said selector within the group. Thereupon register EN transmits the first translated digit over the following circuit: wire $c2$ (Fig. 5) through finder *CHE*, wire $c$ (Fig. 6), front $bp3$ and $ap3$, were $fp63$, receiving relay D$p$. Either one or two D$p$ relays are operated, depending on the selection combination received. If no combination is received, both D$p$ relays will remain unoperated, but this absence of any polarity will be interpreted by director ORP as an actual selection combination. Each of the energized D$p$ relays completes the following holding circuit for itself: battery, right-hand winding of relay D$p$, front $dp1$, front $ep1$, ground. In addition, the D$p$ relays comprise $dp2$ contacts, which, according to a well-known method described in the above-mentioned patent application, make up a pyramid of contacts. Four wires such as $d$ come out of this pyramid, each of these wires corresponding to one selection combination.

Following a similar method, the register sends the second translated digit to relays U$p$. In the case of the second digit, two receiving wires, $fp64$ and $fp65$, are used. Each of these wires is connected to the two U$p$ relays. The two U$p$ relays connected to wire $fp64$ allow obtaining four different combinations, as described above. The other U$p$ relays likewise allow obtaining four combinations. It is therefore possible to obtain a total of $4\times4=16$ different selection combinations, of which only 10 will be used. Each of these 10 combinations will be used to select one 500-subscriber group out of the 5000-subscriber group already selected by the first translated digit. In fact, no sooner has first selector SEP chosen a group of 5000 subscribers in response to the first translated digit received over the D$p$ relays, than second selector SES selects the 500 group. Yet, first selector SEP must also register the second translated digit, as it has to choose a second selector SES giving access to at least one free line in the group corresponding to the combination of the first two digits translated.

Each of the U$p$ relays completes the following holding circuit for itself: battery, right-hand winding of relay U$p$, front $up1$, slow-operating relay L$p$, front $ep1$, ground. Only one L$p$ relay has been provided for director ORP, said relay being multipled on the four U$p$ relays. The relays, at $up2$ and $up3$, prepare the circuit for the transmission of the second translated digit to the ORS director associated with selector SES. Moreover, the various U$p$ relays include contacts such as $up4$, which, according to a well-known method, constitute a contact pyramid. Ten $u$ wires extend out from this pyramid, each of these wires corresponding to a selection combination.

Relay L*p* is slow-operating. The delay it introduces is such that, when relay D*p* becomes energized, the D*p* and U*p* marking relays that must operate actually do operate. At front contact *lp*1, relay L*p* grounds the *d* wire corresponding to the first translated digit. Each of the *d* wires is connected to a G*p* relay. One of these relays thereupon becomes energized, and by its operation characterizes the 5000-subscriber group to be selected. As is apparent from the foregoing description, the first two G*p* relays correspond each to a group of 5000 local subscribers; the other two G*p* relays are associated with subscribers served by distant exchanges. At front contact *lp*2, relay L*p* grounds the *u* wire corresponding to the second digit translated. Each *u* wire is connected to a C*hp* relay; one of these C*hp* relays is energized and, by its operation, characterizes the level of the 500-subscriber group to be selected. At back contact *lp*3, relay L*p* opens the circuit of relay C*p*, which releases; at back contacts *lp*4 and *lp*5 it opens the receiving wires *fp*64 and *fp*65, which causes the register to send out the next digits. However, this has no effect until selectors SEP and SES have been connected to the 500-subscriber group corresponding to the combination of the first two digits translated.

Selector SEP gives access to 50 outgoing lines divided into 4 groups, each group being associated with one of the selection combinations received over the D*p* relays. It will be assumed, by way of example, that the first group comprises 20 lines and that the other three 10 lines each. The first two groups, which are the only ones involved in the case under consideration, are used for local subscribers.

A*ltp* denotes a switching device which, when operated, causes the sequential closing of contacts *altp*1 . . . *altp*5. Contact *altp*1 is multipled on four *gp*1 contacts associated with four different G*p* relays; contact *altp*2 is similarly multipled on four *gp*2 contacts associated with these same G*p* relays; contacts *altp*3, *altp*4 and *altp*5 are multipled in a similar manner. There is thus obtained a total of 20 wires such as *fp*66. The five *fp*66 wires connected to contacts *gp*1 . . . *gp*5 of the first G*p* relay correspond to the first selection combination, that is, to the first group of lines leading out from selector SEP; the five *fp*66 wires connected to contacts *gp*1 . . . *gp*5 of the second G*p* relay correspond to the second selection combination, namely, to the second group of outgoing lines; likewise, the following five *fp*66 wires correspond to the third group and the last five *fp*66 wires correspond to the fourth group.

The 50 lines going out from selector SEP are divided into 10 sub-groups each consisting of five lines. Each group of lines may comprise one or more sub-groups. In the example under consideration, the first group consists of 20 lines, i. e., four sub-groups, while the other three groups have only 10 lines each, i. e., two sub-groups. Each *fp*66 wire is associated with a line sub-group. Since there are 20 *fp*66 wires and only 10 sub-groups, 10 of the *fp*66 wires are not used. Similarly, each *fp*67 wire corresponds to a line sub-group. The four *fp*67 wires corresponding respectively to the four sub-groups of the first group are connected to contacts *gp*1 . . . *gp*4 of the G*p* relay characterizing the first selection combination; the two *fp*67 wires corresponding to the two sub-groups of the second group are connected to contacts *gp*1 and *gp*2 of the G*p* relay characterizing the second selection combination; similarly, the two *fp*67 wires corresponding to the two sub-groups of the third group are connected to contacts *gp*1 and *gp*2 of the G*p* relay characterizing the third selection combination; lastly, the two *fp*67 wires corresponding to the two sub-groups of the fourth group are connected to contacts *gp*1 and *gp*2 of the G*p* relay characterizing the fourth selection combination. As mentioned above, ten of the *fp*66 wires are not used.

The above arrangement makes it possible to distribute at will the various outgoing-line sub-groups of any given group, thus making for great flexibility. Up to five sub-groups, i. e., a total of 25 outgoing lines, may be included in one sub-group, provided the five contacts of the G*p* relay associated with that group are used. The above-described method of distribution has been given only by way of example and many other distribution schemes can be used.

Each of said *fp*67 wires corresponding to one line sub-group is divided into two other wires, *fp*68 and *fp*69. Wire *fp*69 is connected to a relay N*p*. In the example under consideration, the circuit of switch A*ltp* is completed through back *tap*3; this switch operates, causing the consecutive closing of the five contacts *altp*1 . . . *altp*5. These consecutive closings are repeated in a periodic cycle. When contact *altp*1 is closed, the following circuit is completed: ground, contact *altp*1, contact *gp*1 of the energized G*p* relay, one of the *fp*66 wires, wire *fp*67, wire *fp*69, relay N*p*, battery.

Relay N*p* prepares a test circuit for the five lines of the first sub-group of the group dialed.

When contact *altp*1 is closed, the following circuit is likewise completed: ground, contact *altp*1, contact *gp*1 of the energized G*p* relay, wire *fp*66, wire *fp*68, contact *ep*2 of the energized E*p* relay, relay F*p*, battery. Wire *fp*68 is multipled on all the *ep*2 contacts of the various E*p* relays. Since there is one E*p* relay for each set of first selectors, there is a total of *m* E*p* relays and hence 10 *m* contacts *ep*2. Each *ep*2 contact is connected to an F*p* relay. Since there is a total of 10 *fp*68 wires, each E*p* relay comprises 10 contacts identical with *ep*2, each of the *fp*68 wires being multipled on the *ep*2 contacts associated with all the E*p* relays. Lastly, 10 *m* wires such as *fp*60 are obtained, and hence 10 *m* relays F*p*. The operated F*p* relay indicates that the test is about to be made on the first sub-group of lines corresponding to the number dialed, and characterizes the set of first selectors serving this sub-group.

As has been mentioned, director ORP comprises five test relays T*ap*. Each T*ap* relay is multipled on 10 *fp*2 contacts associated with 10 F*p* relays belonging to the same set of selectors, respectively. At the outlet of contacts *fp*2 there are obtained fifty *fp*'62 wires, each associated with an outgoing line of one of the sets of first selectors.

Each T*ap* relay is likewise multipled on the *fp*2 contacts associated with the F*p* relays of the other sets of selectors, and in the end as many groups of fifty *fp*'62 wires are obtained as there are first-selector sets associated with the director ORP under consideration. In the particular case illustrated in Fig. 3, a single ORP director is associated with two multi-connectors, MP and MP', each giving access to the same multipled outgoing lines. The 20 individual selectors of each multi-connector thus make up a set, with a total of 2 sets being provided for first director ORP. There are, consequently, two E*p* relays (Fig. 6), 20 F*p* relays and 100 *fp*2 contacts. The total number of *fp*'62 wires is 5×20=100, each corresponding to an outgoing line. The first fifty outgoing lines are served by the first set of first selectors, while the last fifty outgoing lines are served by the second set of first selectors.

The *fp*1 contacts and the *fp*'61 wires are arranged in the same manner. To each *fp*2 contact there corresponds an *fp*1 contact, and to each *fp*'62 wire there corresponds an *fp*'61 wire.

Each T*ap* relay is multipled, through a *tcp*1 contact, on ten *np*1 contacts associated with ten N*p* relays, respectively. At the outlet of the *np*1 contacts there are obtained, therefore, fifty *fp*'68 wires, each corresponding to one of the fifty outgoing lines of first selectors SEP (first lines). In fact, if there are *m* sets of first selectors SEP, director SOP serves *m* groups of 50 outgoing lines. However, each *fp*'63 wire is used indistinctly for several lines belonging to different sets of selectors but occupying the same level on the banks of the first selectors. Each $fp'63$ wire is multipled on ten $chp1$ contacts associated with 10 $Chp$ relays, respectively. There are thus obtained, at the outlet of contacts $chp1$, five hundred $fp'64$ wires, each characterizing both the position of an outgoing line on the banks of first selectors SEP and the group to be selected by second selector SES in response to the second digit translated. Each first line therefore comprises ten $fp'64$ wires, a particular one of which is engaged, depending on the second digit translated.

Each of second selectors SES accessible from director ORP serves 50 lines. As has been explained, these 50 lines are divided into ten 5-line groups, each group corresponding to a combination of the first two digits translated. Each line accessible through a second selector SES (second line) is associated with a contact $vs3$ (Fig. 8), which is closed when said line is available. The five $vs3$ contacts associated with the lines of one group of five are multipled on a single $fs71$ wire (Fig. 7). If at least one out of the five lines in a group is free, at least one of the five $vs3$ contacts will be closed and wire $fs71$ will be grounded. Each $fs71$ wire therefore coresponds to a 5-line group (second 5-line group). Said lines are served by the same assembly or set of second selectors. If, as has been done in Fig. 3, we let $$\frac{q+1}{2}$$

be the total number of second selector sets, and if it is recalled that each of said selector sets gives access to 10 second groups, the total number of $fs71$ wires is thus $$\left(\frac{q+1}{2}\right)\times 10$$

Each $fs71$ wire corresponding to a given second group served by a given set of second selectors is connected, through a distributor RP6, to the corresponding $fp'64$ wire of the first line having access to said second group. Since a single second group may be served by several first directors, each $fs71$ wire is multipled on several first directors.

It follows from the foregoing that the grounding of the first, second, third . . . $fp'64$ wire of a first line indicates that said first line is connected to a second selector having at least one free line in the first, second, third . . . second group.

It will be assumed throughout the following description that one of the five lines associated with the energized $Fp$ relay gives access to an available second selector associated with a director ORS, also available, and that said second selector gives access to at least one free line in the group dialed. When a second selector SES becomes available, contact $vr1$ is closed, and when the corresponding director ORS likewise becomes available, contact $fr1$ is closed.

The following circuit is then completed: battery, resistance $Re71$, back $fr1$ of director ORS, back $vr1$ of selector SES, wire $fp'62$, front $fp2$, series winding of relay $Tap$, front $tcp1$, front $np1$, front $chp1$, wire $fp'64$, wire $fs71$, back $vs3$, ground. Relap $Tap$ operates. In fact, there are five $Tap$ relays, each testing simultaneously an outgoing line of selector SEP of the same subgroup. If in this sub-group there are several available lines connected to selectors SES giving access to at least one free line in the dialed group, several $Tap$ relays will tend to become energized but cannot do so owing to the fact that they are connected chain-like, according to a well-known wiring arrangement. As in the preceding case, a relay $Tap$, which is faster than the others, operates and prevents the others from being energized.

At back contact $tap1$, relay $Tap$ opens the circuit of relay $Tcp$, which releases; at front contact $tap1$ it shunts the low-resistance lower winding of relay $Tbp$, which is in parallel with its own high-resistance lower winding, so as to bring down the test potential and mark the busy condition to the selected SES second selector. Since the fluxes produced in the two windings of relay $Tbp$ are of equal magnitude and opposite direction, said relay releases, provided the first director ORP under consideration is the only one testing the selected SES second selector; at front contact $tap2$ relay $Tap$ prepares a circuit for selecting magnets $Spp$ and $Sp$; at back contact $tap2$ it opens the circuit of switching device $Altp$, which stops operating.

Relay $Tbp$, at back contact $tbp1$, completes the following circuit: ground, back $tbp1$, front $tap2$, front $fp1$, wire $fp'61$ corresponding to the selected line, lower winding of selecting magnet $Sp$, magnet $Spp$, battery. In the multi-connector associated with the set of selectors under consideration are provided twenty-five $Sp$ and two $Spp$ selecting magnets. The energized $Spp$ selecting magnet prepares the circuit for the connection of the SEP selector under consideration to one of the two series of 25 outgoing lines. The energized $Sp$ selecting magnet prepares the circuit for the connection of the SEP selector under consideration to one of the two series of 25 outgoing lines. The energized $Sp$ selecting magnet prepares the circuit for the connection of the SEP selector to a given line in the 25-line series selected by the $Spp$ magnet. The twenty-five $fp'61$ wires corresponding to the 25 lines of one series are connected to the various lower windings of the $Sp$ magnets, respectively; the twenty-five $fp'61$ wires corresponding to the 25 lines of the other series are connected to the various upper windings of the $Sp$ magnets, respectively. All the lower windings of the $Sp$ magnets are multipled on the same $Spp$ magnet, and all the upper windings of the $Sp$ magnets are multipled on the other $Spp$ magnet.

Relay $Tbp$, at front contact $tbp2$, opens the circuit of relay $Tdp$, but the latter, being slow-operating, does not release at the instant under consideration.

It will be noted that the circuit of contact $np1$, or chain circuit, does not comprise any contact that characterizes the set to which the first calling selector SEP belongs. The same $fp'63$ wire is used regardless of the set involved. Each $fp'63$ wire characterizes only the position of an outgoing line on the banks of the first multi-connector and the group to be selected by second selector SES. This assumes that the outgoing lines in each set of selectors served by the same director have been arranged in such a way that the outgoing lines occupying the same position in the various sets terminate in second selectors having the same outlets. In this manner, the outgoing lines occupying the same positions on the banks of first selectors associated with the same director find the same busy or free condition at the outlet of the second selectors to which they are connected. This however does not in any way void the law of distribution that requires the outgoing lines of a first selector belonging to the same set to be connected to different sets of second selectors.

After the two selecting magnets $Spp$ and $Sp$ have operated, the three wires $fp'64$, $fp'65$ and $fp'66$ are connected to wires $a$, $b$ and $c$, respectively, of the outgoing line selected through contacts $spp1$, $sp1$, $spp2$, $sp2$, $spp3$ and $sp3$. The following circuit is then completed: ground, relay $Hp$, wire $fp'66$, front $spp3$ and $sp3$, wire $c$ of the selected outgoing line, back $vr4$, series windings of relay $Ar$, battery. Relay $Ar$ operates, but relay $Hp$ is prevented from operating by the high resistance of the left-hand winding of relay $Ar$.

Relay $Ar$ marks the seizure of the second director ORS. At front contact $ar1$ relay $Ar$ causes the energization of relay $Tbr$ and prepares a holding circuit for marking relays $Ur$; at front contacts $ar2$ and $ar3$ it completes the circuit for the repetition of the second digit translated from director ORP to director ORS. Depending on the combination of $Up$ relays that have operated (Fig. 6), wire $fp'67$ will be connected either to a source of positive pulsating current, to a source of negative pulsating current or to a source of A. C. The detailed circuits that allow obtaining this result have not been shown, since they are already well known, and have been described in the aforementioned French Patent 1,022,151, particularly with reference to Fig. 7 thereof. The arrow placed near contact *up*2 indicates the direction conventionally chosen as positive for the pulsating current. Said currents are transmitted to the second director ORS through the following two circuits:

(1) Contact *up*2, wire *fp'*67, back contact *hp*1, wire *fp'*64, front *spp*1 and *sp*1, wire *a* corresponding to the line selected, back *vr*2, front *ar*2, back *lr*1, relay U*r*.

(2) Contact *up*3, wire *fp'*68, back *hp*2, wire *fp'*65, front *spp*2 and *sp*2, wire *b* corresponding to the line selected, back *vr*3, front *ar*3, back *lr*2, relay U*r*.

Four U*r* relays have been provided. These relays are arranged with respect to wires *fs*74 and *fs*75 in the same manner as the U*p* relays are arranged with respect to the wires *fp*64 and *fp*65. Furthermore, their operation is identical. When a combination of U*r* relays is energized, it reproduces the combination of energized U*p* relays. As indicated, this combination corresponds to the second digit translated and must allow directing the SES selector to a free line associated with a group of 500 subscribers.

Each of the energized U*r* relays completes the following circuit for itself: battery, right-hand winding of relay U*r*, front *ur*1, relay L*r*, front *ar*1, ground. Moreover, at *ur*2 is shown schematically a pyramid of contacts comprising 10 *fs*72 outgoing wires each corresponding to a second translated digit. Each of these wires terminates in a G*r* relay. One of these relays operates, depending on the second translated digit received.

Five T*ar* relays are provided in second director ORS. Each of these relays is multipled on ten *gr*2 contacts associated with ten different G*r* relays, respectively. At the outlet of contacts *gr*2 there are thus obtained fifty *fs*73 wires each corresponding to one outgoing line of selector SES. Similarly, each of the five *tar*2 contacts associated with five T*ar* relays, respectively, is multiplied on ten *gr*1 contacts associated with ten different G*r* relays, respectively. There are thus obtained at the outlet of the *gr*1 contacts fifty *fs*76 wires each corresponding to an outgoing line of selector SES. The following circuit is then completed: ground, front *tcr*1 of relay T*cr* (which is energized over an obvious circuit), series windings of relay T*ar*, contact *gr*2 of the energized G*r* relay, wire *fs*73, wire *v* and, in the fifties selector (Fig. 8), wire *v*, back *vs*1, which is closed if said selector is available, resistance Re81, battery. In fact, the five T*ar* relays of director ORS simultaneously test five fifties selectors, but, for reasons already mentioned, only one of them can operate.

At its back contact *tar*1, relay T*ar* opens the circuit of relay T*cr*, which releases; at front contact *tar*1 it connects the low-resistance lower winding of relay T*br* in parallel with its own high-resistance lower winding, so as to bring down the test potential on wire *v* and so as thus to mark the busy condition to the fifties selector; the fluxes in the windings of relay T*br* are equal and opposite, and consequently this relay releases. At front contact *tar*2 relay T*ar* prepares a circuit for selecting magnets S*pr* and S*r*.

Relay T*br*, at back contact *tbr*1, completes the following circuit: ground, back *tbr*1, front *tar*2, front *gr*1, wire *fs*76 corresponding to the selected line, lower winding of magnet S*r*, selecting magnet S*pr*, battery. As in the case of first selector SEP, 25 S*r* and two S*pr* magnets are provided. The S*pr* magnet operated selects one of the two series of 25 lines, while the S*r* magnet chooses one out of the 25 lines of the series.

The energized S*pr* and S*r* magnets prepare a holding circuits for themselves over front contacts *spr*1 and *sr*1, as follows: At front contact *spr*2, magnet S*pr* prepares an operating circuit for relay F*r*; at front contact *spr*3 it short-circuits the high-resistance left-hand winding of relay A*r*, which causes the operation of relay H*p* in first director ORP.

At back contacts *hp*1 and *hp*2, relay H*p* opens the second-translated-digit repetition circuit, at front contact *hp*2 it completes the following circuit: ground, relay K*p*, front *hp*2, wire *fp'*65, front *spp*2 and *sp*2, wire *b* corresponding to the line selected by first selector SEP, back *vr*3, front *ar*3, front *spr*2, upper and center windings of relay F*r*, battery. Relay F*r* operates, but relay K*p* cannot operate at the instant under consideration owing to the high resistance of the upper winding of relay F*r*. There is only one F*r* relay in second selector ORS. The two *spr*2 contacts are connected in parallel, each of them being associated with a different S*pr* selecting magnet. At front contact *hp*4, relay H*p* completes the following holding circuit for selecting magnets S*pp* and S*p*; battery, magnet S*pp*, lower winding of magnet S*p*, front *sp*4 and *spp*4, front *hp*4, front *ep*1, ground; at front contact *hp*5 it completes a new circuit over slow-release relay T*dp* before the latter has had time to release.

In second selector SES, relay F*r* prepares a holding circuit for itself over *fr*2; at front contact *fr*3 it short-circuits its high-resistance upper winding, which causes the operation of relay K*p* in first director ORP; at front contact *fr*4 it completes the following holding circuit for selecting magnets S*pr* and S*r*; ground, front *fr*4, front *spr*1 and *sr*1, selecting magnets S*r* and S*pr*, battery.

Relay L*r*, which has operated after some delay, completes the following holding circuit for relay F*r*: battery, lower winding of relay F*r*, front *fr*2 and *lr*3, ground; at back contacts *lr*1 and *lr*2 it isolates the U*r* receiving relays so as to prevent their untimely operation in response to the third selection combination at the instant when the connection is established with first selector SEP.

In first director ORP (Fig. 6), relay K*p* completes the following circuit over *kp*1: ground, front *kp*1, front *ap*4 and *bp*4, wire *fp'*69 individual to the SEP selector under consideration, control magnet VP, battery.

Control magnet VP causes first selector SEP to be connected to the outgoing line corresponding to the second selector SES selected. At front contact *vp*1 it completes the following holding circuit for itself: battery, magnet VP, front *vp*1, wire *v* and ground in the register link; at back contacts *vp*2 and *vp*3 it isolates wires *a* and *b* of first director ORP; at front contact *vp*4 it completes the following circuit: ground, front *vp*4, wire *v* through first selector SEP, control magnet VR of the second selector SES selected, battery; at back contact *vp*5 it opens the circuits of relays P*p* and B*p*, which release.

In second selector SES, magnet VR connects this selector SES to the outgoing line terminating in the selected fifties selector. At back contacts *vr*2 and *vr*3, magnet VR disconnects wires *a* and *b* from director ORS; at back contact *vr*4 it opens the circuit of relay A*r*, which releases; and at front contact *vr*5 it grounds wire *v*, so as to prepare a holding circuit for the following members.

The calling subscriber is now connected to a given fifties selector corresponding to the combination of the first two digits translated.

Directors ORP and ORS then release in the manner described below. In first director ORP (Fig. 6), relay P*p*, at *pp*1, opens the circuit of relay A*p*, which releases. Relay A*p*, at *ap*7, opens the circuit of relay E*p*, which also releases. At *ep*1, relay E*p* opens the circuits of marking relays U*p* and D*p* and that of slow-acting relay L*p*; at front contact *ep*2 it opens the circuit of relay F*p*. The D*p* relays, through the contacts of pyramid *dp*2, open the circuit of relay G*p*. Relay F*p* opens at *fp*1 the operating circuit of selecting magnets S*pp* and S*p*, which release since their holding circuit is opened at *ep*1; at *fp*2 relay F*p* opens the circuit of relay T*ap*. The U*p* relays open at *up*4 the circuit of relay C*hp*. Selecting magnets S*pp* and S*p*, through contacts *spp*2 and *sp*2, open the circuit of relay K*p*; at *spp*3 and *sp*3 they open the circuit of relay H*p*. Relay G*p* opens the circuit of relay N*p* at *gp*1. Other arrangements (not shown) also restore relays T*bp*, T*cp* and T*dp* to their unoperated positions.

In second director ORS (Fig. 7), relay A*r*, upon releasing, opens at *ar*1 the circuit of U*r* and L*r*. The U*r* relays open at *ur*2 the circuit of relay G*r*. Relay G*r*, at *gr*2, opens the circuit of relay T*ar* as well as the lower winding of relay T*br*. The latter releases, since the circuit of its upper winding is already opened at *ar*1. Relay L*r* opens the holding circuit of relay F*r* at *lr*3. Relay F*r*, at *fr*4, opens the holding circuit of selecting magnets S*pr* and S*r*, which release, since their operating circuit has already been cut off at *gr*1 and *tar*2.

Directors ORP and ORS are then completely released and may be used for routing the next call.

A description will now be given, with reference to Figs. 8 and 4, of how the fifties selector and the final selector are directed to the called subscriber line. Upon the receipt at register EN (Fig. 5) of the last digit dialed by the calling subscriber, the register grounds wire *c*2 (over circuits not shown) and the following circuit is then completed: ground on wire *c*2, wire *c*2 through finder CHE, wire *c* through first selector SEP and second selector SES (Figs. 6 and 7), wire *t* (Fig. 8), back *vs*2, resistance R*e*82, pilot relay P*s*, battery. Referring to Fig. 2, it is seen that a director such as ORC controls all the fifties selectors associated with one and the same multi-connector MC, i. e., 20 fifties selectors. These 20 selectors are divided into two groups of 10. The ten *f*81 wires (Fig. 8) associated with the selectors of one and the same group are multiplied to the same pilot relay P*s* through a decoupling resistance R*e*82. The energized P*s* relay therefore characterizes the group to which the calling selector belongs.

At front *ps*1 relay P*s* completes the circuit of relay A*s*. There are as many A*s* relays as there are P*s* relays, namely two. Each of these relays has its own circuit passing in series through a back *as'*1 of the other relay so as to prevent the simultaneous operation of the two relays in the event there are two calling selectors SEC in two different groups.

At front contacts *as*2 and *as*3 relay A*s* prepares a circuit for receiving the third digit; at front *as*4 it completes the following circuit: wire *t* grounded through a circuit already described, back *vs*2, wire *f*81, front *as*4, relay Bs, battery. Wires *f*81 individual to each of selectors SEC are multiplied in pairs to the same relay B*s*; the two wires that characterize two SEC selectors occupying the same level but located in different groups are multiplied. Energized relay B*s* therefore indicates the level of the calling SEC selector within the group of 10 selected by relay P*s*.

After relay B*s* has operated, wire *f*82 of director ORC is connected to the *a* wire of fifties selector SEC through contacts *as*3 and *bs*2; through contacts *as*2 and *bs*1, wire *f*83 is connected to the *b* wire of said fifties selector, thereby preparing the circuit for receiving the selection combinations which allow selecting the called subscriber in the 500 group. At front *bs*3 relay B*s* prepares the circuit of control magnet VS of fifties selector SEC; at front *bs*4 relay B*s* completes the circuit of relay C*s*. There is only one C*s* relay in the whole director ORC, and all contacts such as *bs*4 are multiplied to this relay.

At front *cs*1 relay C*s* completes the circuit of the right-hand winding of relay D*s* as well as the circuit of the upper winding of relay T*b*. These two relays pull up.

The last digits, which are received in the form of polarity combinations over the *a* and *b* wires entering selector SEC, are transmitted to the *f*82 and *f*83 wires, and from there to receiving device RCC.

The routing of the last two selection stages SEC and CCN is effected by a three-digit combination, consisting of the hundreds, tens and units digits of the called subscriber. The hundreds digit is received by a set of relays C*n* shown schematically by three rectangles placed back to back. Since the problem is one of selecting a called subscriber from a group of 500, five different hundreds digits can be received. In order to receive these five different digits, it is necessary merely to provide three C*n* relays, thereby obtaining 2×2×2=8 combinations. These relays C*n* are arranged in the same manner as the U*p* relays of Fig. 6 and they operate in exactly the same way; the only difference is that there are three receiving relays instead of four.

The tens digit is received by a relay combination represented schematically by four rectangles placed back to back. Since this digit is used to select a definite tens within the hundreds already selected by the C*n* relays, 10 different tens digits can be received. In order to receive these 10 different digits, it is necessary to provide four D*n* relays, thereby obtaining 2×2×2×2=16 combinations. They operate in exactly the same way as the C*n* relays.

The units digit is received by a combination of relays U*n*. Since there are 10 different tens digits that can be received, four U*n* relays have been provided.

The arrangements provided for having the register terminate the transmission of one digit and begin that of the following digit are identical with those already described in the case of first director ORP, and are not shown in director ORC.

When the hundreds, tens and units digits have been received by device RCC, the three contacts *cn*1, *dn*1 and *un*1 are closed and relay T*n* pulls up. Contacts *cn*1, *dn*1 and *un*1 may be associated directly with marking relays C*n*, D*n* and U*n*, or else they may be associated with relays guiding each of the three groups of marking relays.

Figure 4:
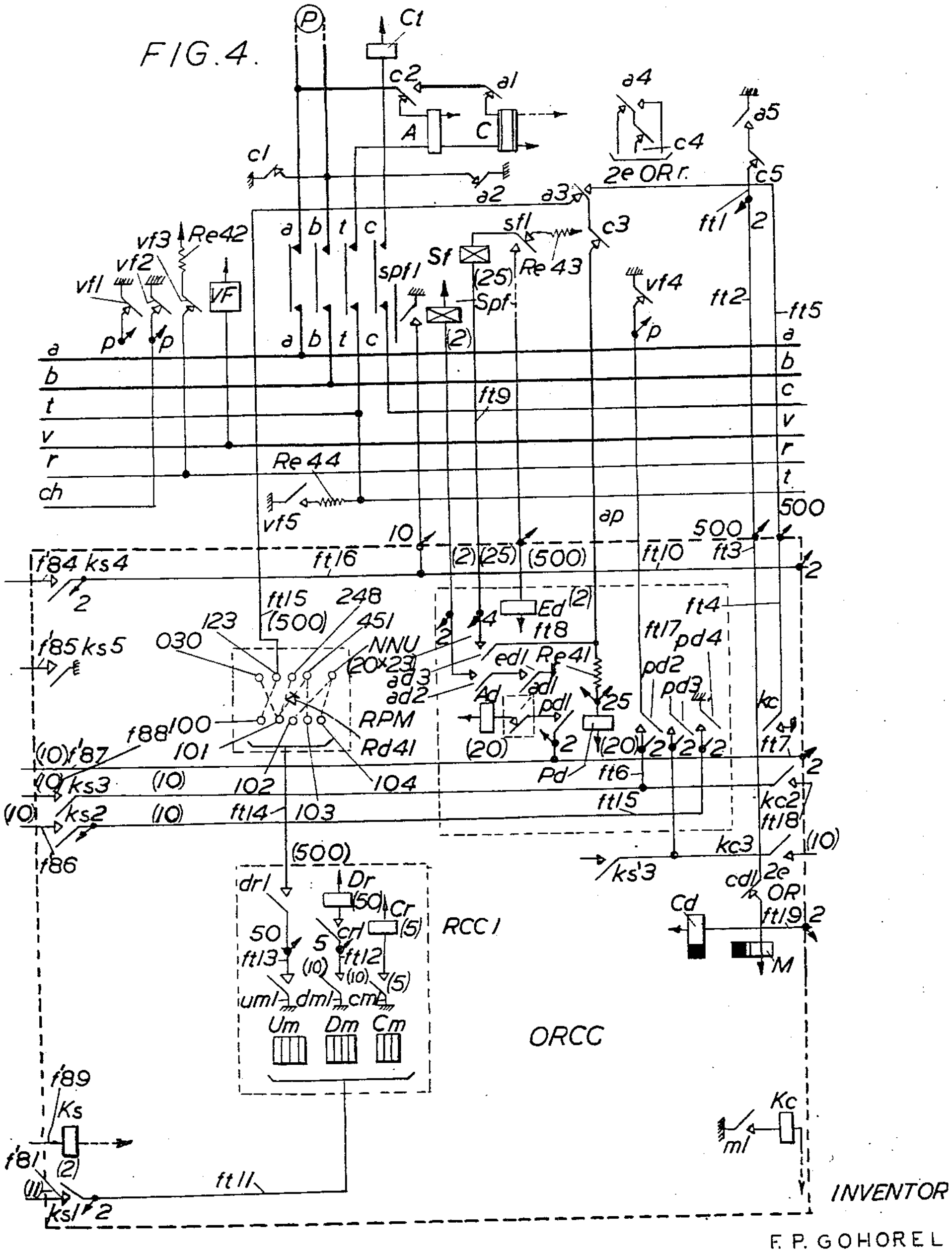
Fig. 4 shows the subscriber line equipment, the circuit elements of a finder-connector and the circuit elements of the associated director.

A front *tn*1 relay T*n* completes the circuit of relay K*s*, Fig. 4. As will be seen from Fig. 2, two fifties-selector directors ORC and ORC' are associated with one and the same finder-connector director ORCC. Director ORCC (Fig. 4) comprises two relays such as K*s*, the operated K*s* relay indicating the calling ORC director. The circuit of relay K*s* passes in series through a back contact (not shown) of relay K*c*; consequently, relay K*s* can operate only if director ORCC has not already been seized for hunting a calling subscriber. At contact *tn*2 relay T*n* isolates receiving wire *f*82 of the C*n*, D*n* and U*n* relays and connects it to front contacts *oc*1 and *of*3 for purposes that will be explained hereinafter.

In director ORCC (Fig. 4) relay K*s* connects, over front contacts such as *ks*1, receiving device RCC of director ORC to receiving device RCC1 of the finder-connector director. Receiving device RCC1 comprises, the same as receiving device RCC, a group of three marking relays C*m* for registering the hundreds digit, a group of four marking relays D*m* for registering the tens digit and a group of four marking relays U*m* for registering the units digit.

Each of the three C*n* marking relays comprises a contact *cn*2, connected through a contact *ks*1 to the corresponding C*m* marking relay of the finder-connector director; likewise, each of the four D*n* marking relays comprises a contact *dn*2, which is connected through a contact *ks*1 to the corresponding D*m* marking relay of the finder-connector director; and finally, each of the four U*n* marking relays comprises a contact *un*2, connected through a contact *ks*1 to the corresponding U*m* marking relay of the finder-connector director. Relay K*s* hence comprises a total of 3+4+4=11 *ks*1 contacts. Each of the *ft*11 wires is multiplied to the two *ks*1 contacts respectively associated with the two K*s* relays characterizing the two fifties-selector directors associated with one and the same finder-connector director.

From the foregoing description it follows that the last three digits of the called subscriber's number, which are first received by device RCC, are transmitted to receiving device RCC1.

The energized K*s* relay completes at front *ks*5 the circuit of relay O*c*, but the latter, being a slow-acting relay, does not operate at the moment under consideration. At front *ks*2, *ks*3 and *ks*4 relay K*s* establishes the continuity of various connecting wires between director ORCC and director ORC.

The C*m* relay group incorporates a contact pyramid represented schematically by a front contact *cm*1. Five wires each characterizing a given hundreds and terminating at a relay Cr leave this pyramid. The Cr relay that characterizes the dialed hundreds therefore pulls up. The Dm relay group incorporates a contact pyramid represented schematically by a front contact dm1. Ten ft12 wires, each multiplied to five cr1 contacts associated with various Cr relays, leave this pyramid. There are thus obtained, at the outlet of the cr1 contacts, 50 Dr relays, each characterizing a given tens in the group of 500 subscribers served by the ORCC director under consideration. In the example described, the Dr relay that characterizes the called subscriber's tens pulls up over contact pyramid dm1, wire ft12 and a contact cr1 of relay Cr, previously energized. The Um relay group incorporates a contact pyramid represented schematically by a front contact um1. Ten ft13 wires, each multiplied to 50 dr1 contacts belonging to various Dr relays, leave this contact pyramid. At the outlet of contacts dr1 are thus obtained 500 marking wires ft14, each characterizing a subscriber within the 500-subscriber group served by one and the same finder-connector director ORCC. In the case under consideration, the ft14 wire belonging to the called subscriber is grounded across contact pyramid um1, wire ft13 and contact dr1 of the energized Dr relay.

The 500 ft14 marking wires are connected to the input of a distributor RPM. In order not to complicate the figure, this distributor shows only the input terminals belonging to subscribers 100 to 104. Distributor RPM comprises a certain number of output terminals, each corresponding to the position of a subscriber with respect to the finder-connectors and to the fifties selectors serving him. Thus, the first output terminal, placed to the left of distributor RPM and denoted by reference 030, corresponds to a subscriber occupying the 30th position on the banks of the finder-connector and belonging to the No. 1 fifties, assuming that the 10 fifties of the 500 group correspond respectively to subscriber 000 . . . 050, 051 . . . 100 . . . Likewise, output terminal 123 corresponds to a subscriber occupying the 23rd position on the banks of the finder-connector and belonging to the No. 3 fifties.

The above-described arrangements allow assigning, within a 500 group, a definite call number to a subscriber occupying any position with respect to finder connector CCN and to fifties selector SEC. Thus, in the case of the figure, call number 100 corresponds to the subscriber occupying position No. 123; call number 101 corresponds to a PBX subscriber having several lines connected respectively to positions 030, 248 and 451; call number 103 allows ringing individually the last line of the preceding group, that is, the line occupying position 451; and finally, call numbers 102 and 104 are not used, the corresponding terminals 102 and 104 being connected to the same output terminal NNU.

It will be assumed in all that follows that number 100 has been dialed. The following circuit is then completed: ground contact pyramid um1, wire ft13 characterizing unit O, contact dr1 of relay Dr characterizing tens 10, wire ft14 characterizing call number 100, input terminal 100 of marking distributor RPM, output terminal 123 of said distributer, wire ft15 individual to the subscriber occupying position 123 with respect to the finder-connector and to the fifties selector, back a3 and c3, decoupling resistance Re41, relay Pd, battery. The preceding circuit cannot be completed unless contacts a3 and c3 are closed, that is, unless the subscriber is free.

The energized Pd relay, as already indicated, is common to the 25 subscribers of a half fifties group. At front pd1 it prepares the circuit of relay Ad; at front pd2 it completes the following circuit: ground, back vf4, front pd2, wire ft6, front ks3, relay Gs, battery. The two pd2 contacts respectively corresponding to the two half fifties subgroups of one and the same fifties group are multiplied to one and the same ft6 wire; the energized Gs relay therefore characterizes the fifties subgroup that must be selected by selector SEC. Moreover, the two pd2 contacts characterizing the subscribers of one and the same fifties group are multipled to the back contacts vf4 of the control magnets VF of all the finder-connectors CCN serving this fifties group. If there is none available among said finder-connectors, all the vf4 contacts are opened and relay Gs cannot energize. As has been indicated, director ORC gives access to four finder-connectors capable of serving the called fifties subgroup; under these conditions each pd2 contact should be multiplied to four vf4 contacts. Relay Pd completes the following circuit over front pd4: ground, front pd4, wire ft15, front ks2, relay Go, which energizes, battery. The two pd4 contacts of the fifties subgroup involved are multiplied to one and the same ft15 wire; the energized Go relay therefore characterizes the fifties subgroup that must be selected by director ORC.

Relay Go opens at go2 the circuit of Oc, which, being a slow-acting relay, was unable to pull up.

Relay Gs completes the following circuit over front gs1: ground, front gs1, front pd1 of relay Pd energized, back ad'1, relay Ad, battery. Relay Ad energized indicates the level of the half fifties subgroup that must be selected by director ORCC. At front gs2 and gs3 relay Gs completes the following circuit: ground, front gs3, front tc1 (relay Tc being energized over an obvious circuit), series windings of relay Ta, front gs2, back vf3, resistance Re42, battery. Five Ta relays have been provided in director ORC. The first four Ta relays are used to test a finder-connector; the last Ta relay is used with the other four to test a cooperating selector in accordance with a method that will be described hereinafter. Each of the first four Ta relays is multiplied to 10 gs2 contacts respectively belonging to the ten Gs relays. At the outlet of contacts gs2 are thus obtained 40 f84 wires each corresponding to a line outgoing from fifties selector SEC and terminating directly at a finder-connector CCN. If there are several lines free in the fifties subgroup that must be selected, several Ta relays will tend to energize, but this latter is made impossible by the fact that said relays are disposed in a chain, in accordance with a known arrangement. At front gs4 relay Gs prepares the circuit of selecting magnets Sps and Ss of fifties selector SEC.

The Ta relay energized opens at ta1 the circuit of relay Tc, which falls back; at front ta1 it places the lower low-resistance winding of relay Tb in parallel with its own lower high-resistance winding, in order to lower the test potential on wire f84 and to busy the selected finder-connector CCN; the fluxes produced by the two windings of relay Tb being equal and opposite, said relay Tb falls back, assuming however that the ORC director involved is the only one to selected finder-connector CCN. Relay Ta prepares the circuit of selecting magnets Sps and Ss over front ta2.

Relay Tb completes the following circuit over tb1 upon falling back: ground, back tb1, front ta2, contact gs4 of relay Gs energized, wire f85, selecting magnets Ss and Sps. There is only one Tb relay in the whole of director ORC, and there is also only one tb1 contact. On the other hand, there are four ta2 contacts, which are arranged in a chain. At the outlet of contacts ta2 are thus obtained four f86 wires, each multipled to ten gs4 contacts associated with the 10 different Gs relays. At the outlet of the gs4 contacts are thus obtained 40 f85 wires, each corresponding to one of the lines outgoing from fifties selector SEC. Selecting magnets Ss and Sps are arranged according to the method already described for the selecting magnets of the first selector and those of the second selector. There are two magnets Sps, which choose a group of 20 outgoing lines, and twenty magnets Ss, which choose an outgoing line in the group selected by magnet Sps. The combination of the Sps and Ss magnets operating prepares the connection of selector SEC to the line selected.

At sps1 and ss1 selecting magnets Sps and Ss connect front *co*1 to the *v* wire corresponding to the outgoing line selected, and this prepares the operation of control magnet VF of finder-connector CCN; at *sps*2 and *ss*2 they connect the left-hand winding of relay D*s* to the *t* wire corresponding to the outgoing line selected, and this prepares a test circuit for the called subscriber; at front *sps*3 magnet S*ps* prepares the circuit of relay C*o*.

In finder-connector director ORCC relay A*d* prepares the circuit of selecting magnet S*pf* at front *ad*2; at *ad*3 it completes the following circuit: ground on wire *ft*8 already used to energize relay P*d*, front *ad*3, selecting magnet S*f*, back *sf*1, resistance R*e*43, battery.

Selecting magnet S*f*, which selects the called line from among the 25 lines belonging to the same half fifties subgroup, pulls up. At back *sf*1 it prevents the operation of the other S*f* magnets of the lines belonging to the same half fifties subgroup; at front *sf*1 it completes the following circuit: battery, relay E*d*, front *sf*1, selecting magnet S*f*, wire *ft*9 and ground across a circuit previously described. As already indicated, relay E*d* is provided to select the half fifties subgroup to which the called line belongs.

At front *ed*1 relay E*d* causes the energization of selecting magnet S*pf*, which, on operating, selects the called half fifties subgroup.

Selecting magnet S*pf* completes the following circuit over *spf*1: ground, front *spf*1, only *ft*16 wire in director ORCC, front *ks*4, one of the two *sps*3 contacts, relay C*o*, battery.

Relay C*o* completes the following circuit over front *co*1: ground, front *co*1, front *sps*1 and *ss*1, wire *v* of the outgoing line selected, control magnet VF of selected finder-connector CCN, battery; at front *co*2 it completes the following circuit: ground, front *co*2, front *ds*1, relay O*c*, battery. Relay O*c*, being slow to act, does not energize at the moment involved.

Control magnet VF causes the corresponding finder-connector to be connected to the called subscriber line. The following circuit is then completed: ground, left-hand winding of relay D*s*, front *sps*2 and *ss*2, *t* wire corresponding to the outgoing line selected by fifties selector SEC, wire *t* across finder-connector CCN, lower windings of relays A and C, battery. The fluxes produced by the two windings of relay D*s* being equal and opposite, said relay falls back, assuming however that the second director ORC involved is the only one to test the called subscriber. At front *vf*5 magnet VF completes a holding circuit for line and cut-off relays A and C of the called subscriber.

At front *ds*1 relay D*s* opens the circuit of relay O*c*, which, being slow to operate, has not had time to operate; at back *ds*1 it completes the following circuit: ground, front *co*2, back *ds*1, back *of*2, front *as*5 and *bs*3 characterizing the seized selector SEC, control magnet VS of selector SEC, battery.

Control magnet VS causes fifties selector SEC to be connected to the finder-connector CCN selected. It completes the following holding circuit over front *vs*1: battery, magnet VS, front *vs*1, wire *v* (Fig. 7), wire *v* across second selector SES, front *vr*5, ground; over back *vs*2 it removes the ground from wire *t* to wire *f*81, and this causes the release of director ORC in accordance with a method to be explained hereinafter; over front *vs*4 it completes a holding circuit for magnet VF of finder-connector CCN: ground, front *vs*4, wire *v* across fifties selector SEC, magnet VF, battery.

Director ORC releases as follows: Owing to the removal of the ground from wire *f*81, relays P*s* and B*s* release. At *bs*4 relay B*s* opens the circuit of relay C*s*. At *ps*1 relay P*s* opens the circuit of relay A*s*. Marking relays C*n*, D*n*, U*n* have a holding circuit (not shown) similar to that of the marking relays of the preceding selection stages, and since it passes in series through a front contact of general holding relay C*s*, they therefore fall back immediately after said relay C*s* and cause the homing of relays T*n*, C*m*, D*m*, U*m*. Relay T*n* opens the circuit of relay K*s* at *tn*1.

In director ORCC marking relays C*m*, D*m* and U*m* cause upon releasing the homing of relays C*r*, D*r* and P*d*. Upon releasing, relay K*s* opens the circuit of relays G*o*, G*s* and C*o* of director ORC. Relay P*d* opens the circuit of relay A*d* at *pd*1. Relay A*d* opens at *ad*2 and *ad*3 the circuits of selecting magnets S*f*, S*pf* and of relay E*d*. Director ORCC is fully released and can be used to route another call.

In director ORC relay G*s* upon releasing opens the circuit of relay T*a* at *gs*2 and *gs*3; at *gs*4 it opens the circuit of selecting magnets S*ps* and S*s*. Relays T*b* and D*s* home, having the circuit of their two windings opened. Director ORC is fully released and can be used for the routing of another call.

When register EN (Fig. 5) has transmitted the final digit, it releases, relay L*e* releasing owing to the opening of contacts not shown; at *le*1 it opens the holding circuit of magnet VE, and this causes the release of register finder CHE.

Link JE is then connected metallically to the called subscriber over the following circuit: outgoing wire *a* in register link JE (Figs. 5 and 6), wire *a* across first selector SEP and second selector SES (Figs. 7 and 8), wire *a* across fifties selector SEC and finder-connector CCN (Fig. 4), called subscriber P, wire *b* across finder-connector CCN, fifties selector SEC (Fig. 8), second selector SES (Fig. 7), first selector SEP (Fig. 6) and link JE (Fig. 5).

The ringing current is then sent to the called subscriber in accordance with a known method and, when he removes his receiver, he finds himself connected with the calling subscriber across link JE. Said link comprises in addition, in accordance with a known method, arrangements for supplying transmitter feed to the called subscriber station and the calling subscriber station and for indicating that both subscribers have hung up.

The metering pulses are transmitted to the calling subscriber's meter over the following circuit: incoming wire *c* in link JE, wire *c* across second finder CHS and finder-connector CCN, calling subscriber's meter C*t*, battery.

When one of the subscribers or both have hung up, link JE controls the various operations involved in the release of the connection. A general holding relay (not shown) falls back, opens the holding circuit of relay C*a* and removes the ground from outgoing wire *v*. In addition, the ground is removed from incoming wire *v* owing to the opening of front contact *ca*4. Due to this, the various magnets VF, VC of the selection chain on the calling subscriber's side fall back, and the various magnets VP, VR, VS and VF of the selection chain on the called subscriber's side also fall back. The various members used for establishing the connection are fully released. It will be noted that the holding ground of the magnets is cut off before the contacts of the selectors are opened, so as to prevent breaking sparks on these contacts.

After having discussed the general case, a number of special cases likely to arise in the course of the routing of a call will now be examined and it will be assumed, to begin with, that the called subscriber is busy. In that case, at least one of back contacts *a*3 or *c*3 belonging to this subscriber is opened, relay P*d* cannot operate and the sequence of operations cannot take place. During this time, the circuit of slow-acting relay O*c* is always completed across back *go*2 and front *ks*5; after a certain period of time, said relay O*c* pulls up. At front *oc*1 relay O*c* causes a positive polarity to be applied to the following circuit: front *oc*1, front *tn*2, wire *f*82, front *as*3 and *bs*2, wire *a* across the second and the first selectors. This positive polarity finally reaches link JE and causes its release in accordance with a method that has not been described because it is of no interest as regards the invention. Said link JE then removes the ground from incoming wire $v$ and outgoing wire $v$, this causing the release of all the seized members in accordance with a method similar to that already described; only the equipment associated with the calling subscriber's line remains seized and it causes the sending of the busy tone to said calling subscriber.

In effect, when the ground is removed from wire $t$ of said equipment (Fig. 4), the circuit of the lower windings of relays A and C is opened; relay A, fast-acting, releases immediately; relay C, somewhat slow-releasing, holds over the following circuit: battery, upper winding of relay C, back *a*1, front *c*2, loop of calling station P, back *a*2, ground. A pilot relay, not shown, energizes in series with the upper winding of relay C and causes the busy tone to be sent to the calling subscriber.

When the latter hangs up, relay C and the busy-tone sending relays release.

The operation of the subscriber line equipment is identical with that already described when one of the subscribers stays on the line and the chain of members used for establishing the connection has been released.

The case will now be discussed where the fifties selector director ORC cannot have access to any available finder-connector CCN in the fifties subgroup comprising the called subscriber (Figs. 8 and 4). As has been indicated, relay G*s* operating in director ORC characterizes the called subscriber's fifties subgroup. The circuit of said relay passes through a contact *ks*3, wire *ft*6, a contact *pd*2 and wire *ft*17. Said wire *ft*17 is multiplied to the back contacts *vf*4 associated with the control magnets VF of all the finder-connectors CCN capable of serving the called fifties subgroup. When all these finder-connectors are busy, all the *vf*4 contacts multiplied to the same *ft*17 wire are opened and relay G*s* cannot operate. Relay O*f* then energizes across back contact *gs*1. At front *of*1 it prepares the circuit of relay C*o*; at front *of*2 it prepares the circuit of control magnet VS of selector SEC; at front *of*3 it causes the transmission of a negative polarity to the register over the following circuit: battery, front *of*3, front *tn*2, front *as*3 and *bs*2, wire *a* across the second selector, the first selector, register link JE (Fig. 5), wire *a*2 across finder CHE, register EN. This polarity will cause said register to transmit again selective combinations corresponding to the last three digits of the called subscriber's number, for a purpose that will be explained subsequently. Relay O*f* completes the following circuit over front *of*4: ground, back *ta*3, front *of*4, switching device A*lts*, battery. Switching device A*lts* operates and causes the consecutive closing of contacts *alts*1 and *alts*2 in accordance with any given but readily imaginable method. The consecutive closing of said contacts then continues according to the same cycle as long as the circuit of device A*lts* remains completed.

Each of the two contacts *alts*1 and *alts*2 is connected to a relay B*o*. When contact *alts*1 is closed, the first of relays B*o* pulls up.

As has been indicated, director ORC comprises 5 test relays T*a*. The upperwinding of each or relays T*a* is connected to a wire *f*87, said wire being multiplied to two contacts *bo*3 respectively associated with the two different B*o* relays. At the outlet of said contacts *bo*3 are thus obtained 10 wires *f*88 each corresponding to an outgoing line of the fifties selector SEC belonging to the cooperating group.

Each of the 5 *ta*2 contacts respectively associated with the 5 T*a* relays is connected to a wire *f*89, each of said wires *f*89 being itself multipled to two contacts such as *bo*2 respectively associated with the two B*o* relays. At the outlet of said contacts *bo*2 are thus obtained 10 wires *f*80 each corresponding to an outgoing line of fifties selector SEC and belonging to the cooperating group.

The lower winding of each of the T*a* relays is connected across front contact *tc*1 to a wire *f*80, said wire being multipled to two contacts such as *bo*1 respectively associated with the two B*o* relays. At the outlet of said contacts *bo*1 are thus obtained 10 *f'*81 wires each corresponding to an outgoing line of fifties selector SEC and belonging to the cooperating group.

Each of the 10 *f'*81 wires is multipled in turn to 10 *go*1 contacts belonging to the 10 different G*o* relays. At the outlet of contacts *go*1 are thus obtained 100 wires *f'*82. Each of said wires *f'*82 characterizes both an outgoing line to the cooperating selector and one of the ten fifties subgroups capable of being reached by said cooperating selector. Each of the 10 lines of the cooperating group (or cooperating line) therefore comprises 10 *f'*82 wires, any one of which is seized depending upon the fifties subgroup comprising the called subscriber.

Each of the cooperating selectors SEC' capable of being reached from director ORC serves 40 lines each terminating at a finder-connector CCN; as has been indicated, said 40 lines are divided into ten 4-line groups, each group corresponding to fifty subscribers. Each of said lines comprises a contact *vf*2 (Fig. 4), which is closed when the line involved is available. The *p* contacts *vf*2 of the lines of the same group (four in the example described) are multipled to the same wire *f'*83 (Fig. 8). If there is at least one line available in a group, one at least of the four *vf*2 contacts is closed and wire *f'*83 is grounded. Each *f'*83 wire therefore corresponds to one and the same group of 4 lines, said lines being served by one and the same group or assembly of cooperating selectors. If $r$ denotes the total number of cooperating-selector groups ($r=4$ in the case of Fig. 2), and if it is recalled that each of said cooperating-selector groups gives access to 10 line-groups, the total number of *f'*83 wires is therefore $r\times10$. Each *f'*83 wire corresponding to the lines of one and the same fifties served by one and the same cooperating-selector group is connected through a distributor RP8 to the corresponding *f'*82 wire of the cooperating line. Each line group terminating at finder-connectors can be served by $n$ directors ORC (two in the example described), each *f'*83 wire being multipled to two directors ORC.

As follows from the foregoing explanations, the grounding of the first, second, third . . . *f'*82 wires of a cooperating line indicates that said line is connected to a cooperating selector having at least one free line in the first, second, third . . . fifties subgroups.

Each magnet VF comprises a second contact *vf*1 similar to *vf*2 provided for the two directors ORC associated with the other first director ORCC.

It will be assumed in all that follows that the fifties selector SEC involved gives access to at least one free line towards a cooperating selector SEC' and that said cooperating selector SEC' itself gives access to at least one finder-connector CCN available in the fifties subgroup of the called subscriber.

Cooperating selector SEC' has been represented schematically by a simple rectangle; it is designed the same as fifties selector SEC and its operation is identical. In consequence, when one of these cooperating selectors is available, the $v$ wire terminating at said selector is connected to the battery across a contact similar to *vs*1 and a resistance similar to R*e*81. The following circuit is then completed: wire $v$ corresponding to a cooperating selector SEC' that is available and connected to the battery, wire *f*88, contact *bo*3, wire *f*87, series windings of relay T*a*, front *tc*1, wire *f'*80, front *bo*1, wire *f'*81 characterizing the cooperating selector tested, contact *go*1, wire *f'*82 characterizing both the cooperating selector tested and the called subscribe's fifties, wire *f'*83 common to the various finder-connectors CCN of the wanted fifties and reached by the cooperating selector SEC' tested, back *vf*2, ground. The five test relays T*a* simultaneously test five cooperating selectors SEC'; if there are several selectors SEC' available and giving access to at least one finder-connector available in the called fifties subgroup, several T*a* relays would tend to operate, but this latter is rendered impossible for the reasons already set forth, and only one of the Ta relays pulls up.

Over front ta1 relay Ta opens the circuit of relay Tc; over front ta1 (sic-translator) it lowers the test potential on wire f88 and causes the falling back of relay Tb according to a method already described; over back ta3 it opens the circuit of switching device Alts, which stops operating. The alts1 contact that was closed remains closed.

Relay Tb closes the following circuit over back tb1: ground, back tb1, front ta2, wire f89, front bo2, wire f80 characterizing the cooperating selector SEC′ selected, magnet Ss′, magnet Sps, *battery*. Five Ss′ magnets have been provided, which, in combination with the two Sps magnets, allow selecting one cooperating line from among the 10 lines of the cooperating group.

The energized Sps magnet completes the following circuit over front sps3: ground, front of1, front sps3, relay Co, battery.

Relay Co completes the following circuit over front co2: ground, front co2, front of2, front as5 and bs3, control magnet VS of fifties selector SEC, battery.

Magnet VS causes fifties selector SEC to be connected to the cooperating selector SEC′ selected by magnets Sps and Ss′. It holds over vs1, releases director ORC over back vs2 and causes over front vs4 the application of a ground to wire v of cooperating selector SEC′, to maintain the busy condition on said selector. Director ORC upon releasing releases director ORCC in accordance with a method already described.

The a and b wires incoming to fifties selector SEC being connected to the a and b wires of cooperating selector SEC′, the selective combinations corresponding to the last three digits dialed and transmitted again by register EN are received by cooperating selector SEC′. The latter moves then towards an available finder-connector CCN of the called fifties subgroup in accordance with the method already described for selector SEC. The finder-connector CCN reached by the cooperating selector is thereupon directed to the called subscriber, said subscriber being then connected to the register link across a finder-connector CCN, a cooperating selector SEC′, a fifties selector SEC, a second selector SES and a first selector SEP.

When a cooperating selector SEC′ has just been engaged, the last free line of the dialed group to which it has access may become busy. Said cooperating selector then in turn hunts for a cooperating selector; a second signal, constituted by a battery on wire a, is sent to the register. The latter, having already received a similar signal, then releases the whole chain of seized members.

The case has been examined where the called subscriber was busy and where the fifties selector SEC had not found any free outlet in the fifties subgroup dialed, but other cases of busy condition are likely to arise in the course of the routing of a call.

When a calling subscriber lifts his receiver, the two directors ORCC that serve him may both be busied by calls received for a subscriber in the same 500-line group. In that case, each of said directors ORCC comprises an energized relay Ks; relay Kc cannot energize, because its circuit passes in series through back contacts (not shown) of relay Ks. The sequence of operations cannot take place and the call of the subscriber is held up until one of the two directors again becomes available. In practice, the holding time of a director ORCC is very short (a few hundred milliseconds at most), and the call of the subscriber will proceed after a very short period of time.

It may happen that two subscribers belonging to the same 500-subscriber group remove their receivers simultaneously or else that one subscriber removed his receiver while the two corresponding first directors ORCC are handling an outgoing call, that is, a call that must be routed towards link JE across second finder CHS. In that case, arrangements are provided in directors ORCC and ORCH so that only one call will be handled at a given moment. If there are several calling fifties subgroups, several Gc relays would tend to energize, but this latter is rendered impossible by the fact that said relays are disposed in a chain in accordance with a known arrangement. There will thus finally be only one fifties subgroup whose call will be handled at a given moment. It will not be possible to handle the call of a subscriber belonging to some other fifties subgroup until after the full release of directors ORCC and ORCH; it will be noticed in fact that the circuit of relay M, which starts the various operations, cannot be completed again until slow relay Cd is de-energized, that is to say, until after director ORCC has fully released.

If there are two calling half-fifties in the same fifties sub-group, these two calls cannot be handled simultaneously; in fact, the two Ad relays characterizing the two half-fifties of one and the same fifties subgroup mutually cut themselves out over back ad′1.

If there are two calling subscribers in the same-half fifties, these two calls cannot be handled simultaneously; in fact, the 25 selecting magnets Sf characterizing the 25 subscribers of one and the same-half fifties mutually cut themselves out over back contacts such as sf1, the simultaneous operation of the two magnets Sf being rendered impossible.

It may happen that all the finder-connectors serving the calling fifties subgroup are busy. The two ft17 wires corresponding to one and the same fifties subgroup are each multipled to back contacts vf4 of all the finder-connectors serving said fifties subgroup. If all said finders are busy, all the vf4 contacts are open and relay Gc remains unoperated. Its operation is delayed until one of the finder-connectors again becomes free.

It may happen that all the registers associated with the link JE at which the call terminates become busy during the hunting for the calling line. In that case, all the contacts le3 and le4 corresponding to said register are opened, and that prepares the falling back of control magnets VF and VC. Director ORCH then proceeds to hunt for another free link JE as follows.

Chain relay Cha falls back, owing to the opening of contacts le4 of all the registers EN associated with link JE. In the example given it has been assumed that link JE could be associated with 8 registers EN; relay Cha is therefore multipled to 8 contacts such as le4. Relay Cha opens over front cha1 the circuit of relay Ua, which releases.

Relay Ua upon releasing opens at ua1 one of the circuits of control magnet VC of second finder CHS, and that prepares the release of said magnet. Over back ua2 it causes the operation of switching device Altc; at front ua3 it opens the circuit of relay Coc, which, being slow-releasing, falls back with a certain delay.

Relay Coc opens at coc1 the last holding circuit of control magnet VC of second finder CHS, which releases. Control magnet VF of finder-connector CCN, which was held in parallel with control magnet VC, also releases. The connection established across finder-connector CCN and second finder CHS is thus released.

In link JE, relay La releases, said link also releasing; at la1 the ground is removed from wire fe1 and the director of finder CHE is released.

Switching device Altc is similar to those already described; it comprises a certain number of contacts altc1 . . . altc4, which are closed in succession according to a periodic cycle. Each of said contacts altc1 . . . altc4 is connected to a relay Ga.

Director ORCH comprises five relays such as Ua. Each of the Ua relays is multipled to 4 contacts ga2 belonging to the 4 different Ga relays. At the outlet of contacts ga2 are thus obtained 20 wires fc5 each corresponding to one of the finders CHS individual to the multi-connector. In fact, reference to Fig. 2 will show that one and the same second-finder director ORCH serves all the second finders of multi-connector MCH, that is, 20 second finders.

The five *ua*1 contacts respectively associated with the five U*a* relays are each multipled to four *ga*1 contacts belonging to the four different G*a* relays. At the outlet of contacts *ga*1 are thus obtained 20 wires *fc*6 each corresponding to one of the individual finders CHS of the multi-connector.

When contact *altc*1 is closed, the first of the four G*a* relays pulls up. Over its various front contacts *ga*1 it prepares the circuit of one of the control magnets VC; over its various front contacts *ga*2 it causes the switching in of five test relays U*a* on five different links JE.

When a register link JE is available, back contacts *ca*5 and *la*3 are closed; when said link is associated with at least one free register EN, relay C*ha* is energized over a back contact *le*4 and front contact *cha*1 is closed. Each of the U*a* relays corresponding to a free link JE associated with an also free register EN has its circuit completed as follows: ground, relay U*a*, contact *ga*2 of the energized G*a* relay, wire *fc*5, front *cha*1, back *ca*5 and *la*3, resistance R*e*51, battery. Only one of the U*a* relays can pull up, owing to the fact that said relays are disposed in a chain according to a known arrangement.

As has been indicated, director ORCH comprises five U*a* and four G*a* relays, which allows obtaining $5\times4=20$ different combinations, each corresponding to one of the second finders CHS of the multi-connector. The U*a* and G*a* relays that have operated therefore jointly characterize the selected second finder CHS and the selected link JE.

Over front *ua*1 relay U*a* prepares an energizing circuit for control magnet VC of the selected second finder CHS; over back *ua*2 it opens the circuit of switching device A*ltc*. The latter stops operating and the *altc*1 contact that was closed remains closed; over front *ua*3 it causes the re-energization of relay C*oc* over a circuit already described.

Over *coc*1 relay C*oc* causes the re-energization of control magnet VF of finder-connector CCN; over front *coc*2 it causes the re-energization of relay C*d* of finder-connector director ORCC; over front *coc*3 it completes a holding circuit for the right-hand winding of relay D*cs*; over front *coc*4 it completes the following circuit: ground, front *coc*4, back *dsc*1, front *ua*1 and *ga*1, wire *fc*6 characterizing the second finder CHS associated with the selected link JE, control magnet VC of said second finder, battery.

Control magnet VC causes finder CHS to be connected to finder-connector CCN. Relay L*a* of the selected link energizes. The two magnets VF and VC hold over the same circuits as those described for the general case.

Calling subscriber P now finds himself connected to the register link JE associated with a free register EN; this connection is always established across the same finder-connector CCN but across another second finder CHS of the same muti-connector.

In the case where none of the U*a* relays has found a free link JE associated with an also free register EN, the various *ua*2 contacts (which are arranged in a chain) remain closed and switching device A*ltc* continues to operate. Contact *altc*1 is opened and contact *altc*2 closes. The first G*a* relay releases and the second G*a* relay attracts its armature. The five U*a* relays then test the five register links JE corresponding to the second G*a* relay. If said links are busy, the switching device closes its contact *altc*3 and the hunting continues according to the same method.

It is quite evident that had there been at once a link JE capable of routing the call and corresponding to the same G*a* relay as the previously-seized link JE, switching device A*ltc* would not have had to operate; another of the five U*a* relays would have been energized immediately, thus causing the connection to be made to the new link JE.

It will be noted that, even in the absence of any call, director ORCH proceeds to hunt for a free link JE associated with a free register EN, in accordance with the method just described. This arrangement has been adopted in order to speed up the routing of a call. It is for that reason that it has been possible to assume, at the beginning of the description of the general case, that director ORCH had already selected a free link and that a combination of relays U*a* and G*a* had energized.

In the description of the operation of first selector SEP it has been assumed that director ORP had selected a free second selector SES having access to at least one free line in the group dialed when contact *altp*1 of switching device A*ltp* was closed. If director ORP cannot select at this moment any free outgoing line capable of routing the call, the five T*ap* relays remain unoperated, all their contacts *tap*3, which are arranged in a chain, remain closed and switching device A*ltp* continues to operate. Contact *altp*1 opens and contact *altp*2 closes. The two relays N*p* and F*p*, which had energized to prepare the testing of a 5-line subgroup, release; two other relays N*p* and F*p*, characterizing another 5-line subgroup but still belonging to the group dialed, pull up. The testing of the 5 lines of this second subgroup is effected according to the same method as for the first subgroup. If this test yields no result, the hunting continues according to the same method, owing to the consecutive closing of contacts *altp*1 . . . *altp*5 according to a periodic cycle. In accordance with a known method, the register may include a time-delay releasing device that will cause the release of all the seized members after a given period of time. Only the equipment individual to the calling subscriber's line remains seized and causes the sending of the busy tone to said subscriber in accordance with a method already described.

It may happen that one of the five lines of the subgroup tested at a given instant by director ORP is available but that said line is connected to a second selector SES having no line available in the group corresponding to the combination of the first two digits translated. In that case, the *fp*′62 wire (Figs. 6 and 7) corresponding to the free outgoing line is connected to the battery over a contact *vr*1 and a contact *fr*1; on the other hand, the *fp*′63 wire corresponding to this same outgoing line is connected through a front contact *chp*1 to a wire *fp*′64 on which there is no ground polarity. In fact, this wire *fp*′64 is connected to a wire *fs*71 common to the five outgoing lines of second selector SES and belonging to the group dialed. This wire *fs*71 is multipled to five contacts *vs*3 (Fig. 8), all of which are opened, since all the corresponding lines are busy. In this case, test relay T*ap* will be unable to operate. The next five first lines are then tested.

If a call coming from director ORC is received at director ORCC (Figs. 8 and 4), while this latter proceeds to hunt for a calling line, relay K*s* cannot energize, the circuit of said relay by-passing by a contact (not shown) on relay K*c*. The energization of relay K*s* is delayed until director ORCC again becomes available.

It may happen that a line belonging to the cooperating group is available but that said line terminates at a cooperating selector SEC′ (Fig. 8) not giving access to any free line leading to a finder-connector of the fifties subgroup dialed. In that case, the *f*88 wire corresponding to the free cooperating line is connected to the battery through wire *v* and a contact similar to *vs*1; on the other hand, the *f*′81 wire corresponding to this same cooperating line is connected through a contact *go*1 characterizing the dialed fifties subgroup to a wire *f*′82 on which there is no ground polarity. In fact, this wire *f*′82 is connected, through distributer RP8, to a wire *f*′83 common to all the finder-connectors CCN reached across cooperating selector SEC′ and belonging to the fifties subgroup dialed. This wire $f'83$ is multipled to the contacts $vf2$ of all these finder-connectors; these contacts are all open, since the finder-connectors involved are all assumed to be busy. In this case, test relay T$a$ will be unable to operate.

If fifties selector SEC can gain access neither to a finder-connector nor to a cooperating selector capable of routing the call, the various seized members are released after a predetermined period of time, as in the preceding case.

It may happen that first selector director ORP (Fig. 6) has chosen an available second selector SES giving access to at least one free line in the group dialed and that said free line or lines become busy during the selection effected by second selector ORS. In that case, none of the T$ar$ relays will be able to operate; all the S$pr$ and S$r$ selecting magnets will remain unoperated, contact $spr3$ will remain open and relay H$p$ will not operate. Slow relay T$dp$ had its energizing circuit opened at $tbp2$ when the selection effected by first director ORP ended. Relay T$dp$ finds no holding circuit, because contact $hp5$ is open; it falls back, after the time delay imposed by its slow-release action.

Relay T$bp$ opens the circuit of the lower windings of relays T$bp$ and T$ap$ at front $tbp1$; relay T$bp$ re-energizes over its upper winding and relay T$ap$ releases.

Relay T$ap$ prepares a re-energizing circuit for relay T$cp$ over back $tap1$; through the opening of front contact $tap2$ it causes the release of the two selecting magnets S$pp$ and S$p$; through back contact $tap3$ it causes switching device A$ltp$ to operate again.

Relay T$bp$ causes the re-energization of relay T$dp$ over front $tbp2$. This relay, which is slow only in releasing, energizes without any delay.

Relay T$dp$ causes the re-energization of relay T$cp$ at $tdp1$. Relay T$cp$ again switches in the five T$ap$ relays over its various $tcp1$ contacts. In accordance with a method already described, director ORP proceeds to hunt for another available second selector SES having access to at least one free line in the group dialed.

If there are several calling register links (Fig. 5), register EN will be able to connect to only one of them; in fact, the selection of a calling link is determined by the operation of a selecting magnet S$e$ and, moreover, two magnets S$e$ cannot energize simultaneously, since they are arranged in a chain (just like relays G$c$, T$ac$, etc.).

Likewise, if there are several registers EN available, any double connection is rendered impossible. The selection of a free register is determined indeed by the operation of one T$e$ relay; two T$e$ relays cannot operate simultaneously, said relays being arranged in a chain.

For similar reasons, two first selectors or two fifties selectors cannot be connected to the same director simultaneously.

If the calling subscriber is selected by two second finder-directors such as ORCH, two D$sc$ relays will be connected in parallel to the same subscriber-line equipment; since the flux produced by the left-hand winding of these relays cannot balance the flux of the right-hand winding, said relays remain energized. The two selecting magnets VC remain unoperated, having their energizing circuits open at $dsc1$, and the sequence of operations cannot take place. During this time, relay C$d$, having its circuit completed through front contact $coc2$, finishes by energizing after a certain time delay; likewise, relay M, having its circuit open at $cd1$, ends up by releasing.

The corresponding ORCC director releases, thus releasing the portion of the connection already established. In fact, the operating time of relays M and C$d$ is not the same for the two ORCC directors respectively connected to the two different ORCH directors; only one of the ORCC directors releases; the D$sc$ relay of the other chain can then effect correctly the test of the called subscriber.

If two SEP first selectors select the same SES second selector, two relays such as T$bp$ are connected in parallel to one and the same test resistance R$e71$. In neither of these relays can the flux produced by the lower winding balance the flux of the upper winding, and said relay remains energized. On the other hand, the two T$ap$ relays cannot hold over their upper winding. In either one of the two ORP directors, the hunting for another SES second selector capable of routing the call proceeds in accordance with the same method as in the general case.

Relays T$ar$ and T$br$ of director ORS (Fig. 7) operate as above described when two ORS directors simultaneously test the same fifties director. Relays T$a$ and T$b$ of director ORC (Fig. 8) also operate in the same manner.

Where two fifties selector directors ORC test one and the same called subscriber, two relays such as D$s$ are connected in parallel to the equipment of said subscriber. For neither of the two D$s$ relays can the flux produced by the left-hand winding balance that of the other winding, and said relay remains energized. Operating magnet VS, having its energizing circuit open at $ds1$, cannot operate. On the other hand, the circuit of relay O$c$ remains completed across front contacts $ds1$ and $co2$; said relay O$c$ operates after a predetermined period of time and at $oc1$ causes the transmission of a positive polarity to the register over a circuit already described. As has been indicated, the register releases the corresponding selection chain. However, the operating time of relays O$c$ is not the same for the two ORC directors; one of these relays, faster than the other, operates and causes the above-described operation, thereby allowing the D$s$ relay of the other director to test the called subscriber correctly.

The case will now be discussed of calls intended for subscribers having several lines grouped under one and the same call number. It will be assumed in all that follows that the subscriber involved is rung by dialing call number 101 within the 500-subscriber group comprising him. It will also be assumed that this subscriber has three lines capable of being rung without distinction by dialing said call number 101; these three lines occupy the positions numbered 030, 248 and 451, with respect to the finder-connectors and to the fifties selectors. As has been already indicated, terminal 101 placed in the lower portion of distributor RPM should be connected to output terminals 030, 248 and 451 of said distributor.

When call number 101 has been registered by the three groups of marking relays C$m$, D$m$ and U$m$, the $ft14$ wire corresponding to call number 101 is grounded in accordance with the method described for the general case. This ground is transmitted through the three terminals 030, 248 and 451 to the three $ft15$ wires characterizing the three subscriber lines. If these three subscriber lines are available, the corresponding $a3$ and $c3$ back contacts are closed, and the P$d$ relay or relays corresponding to these lines pull up.

However, the call will terminate at only one of the three lines, for the following reasons. In fact, if the two or the three lines of the group belong to different fifties, only one G$s$ relay characterizing one of said fifties will be able to operate. In fact, the circuit of each of the G$s$ relays passes in series through back contacts (not shown) of all the other G$s$ relays. If the two or the three lines of the group belong to the same half-fifties in the same fifties, only the A$d$ relay characterizing one of said half-fifties will be able to energize. In fact, the two A$d$ relays characterizing the two half-fifties of one and the same fifties mutually cut themselves out over a back contact $ad'1$. Finally, if the two or the three lines of the group are comprised in one and the same half-fifties, only the S$f$ relay characterizing the level of one of these lines in the half-fifties will be able to energize; in fact, the various S$f$ magnets mutually cut themselves out over back contacts $sf1$. Of course, the fifties, half-fifties and levels in the half-fifties concern the place occupied by each of the lines with respect to the finder-connectors and to the fifties selectors. Finally, the call terminates at one of the three lines of the group.

If one of these lines is busy, the call cannot terminate at said line, owing to the opening of one or of two *a*3 and *c*3 back contacts.

The arrangement that has just been described for line groups corresponding to the same call number offers great flexibility; indeed, it allows dividing these various lines among any positions within a 500-line group. It is particularly advantageous where a subscriber that already has one direct line or several grouped lines would like to have other grouped lines under the same call number.

A line of a group corresponding to a given call number can also be reached through a cooperating selector. In this case, if two lines of the group belong to different fifties, two different G*o* relays operate, said relays not being arranged in a chain. Due to this, the director of fifties selector SEC proceeds to hunt for an available cooperating selector giving access to at least one free line either to a finder-connector of one fifties or to a finder-connector of the other fifties. The selected SEC′ cooperating selector is thereupon connected to a finder-connector belonging to one of the fifties in accordance with the same method as in the general case.

When several lines of a group corresponding to a given call number belong to different fifties and some fifties have finder-connectors available while the others do not, the fifties selector director does no hunting in the cooperating group but selects an available finder-connector giving direct access to one of the lines of the group. In fact, reference to Fig. 8 will show that in this case at least one G*s* relay pulls up and prevents at *gs*1 the energization of relay O*f*.

It may be of interest, in certain cases, to be able to call a given line of the group by dialing a specific call number. Such would be the case, for example, of a specific line of a group that would be connected at night to an attendant's set. It will be assumed in all that follows that by dialing call number 103 it is possible to ring the preceding line of the group, which occupies position 451 with respect to the finder-connectors and to the fifties selectors. In that case, input terminal 103 of distributor RPM will be connected to output terminal 451 of said distributer. When call number 103 has been registered by marking relays C*m*, D*m* and U*m*, the *ft*14 wire corresponding to call number 103 will be grounded. This ground is transmitted through terminals 103 and 451 to an *ft*15 wire characterizing the line occupying dialed position 451. The call is then routed in accordance with a method already described.

It will be noticed that, owing to the presence of rectifier R*d*41, the ground applied to terminal 451 cannot reach terminal 101, hence terminal 030.

Certain call numbers, such as 102 and 104, are not used. The corresponding input terminals of marking distributer RPM are connected to the same output terminal NNU. When a calling subscriber dials one of these call numbers, said terminal NNU is grounded, and that, in accordance with a method that has not been described, causes either the busying of the subscriber or the routing of the call to an operator's position.

The case will now be discussed of calls coming from distant offices. As has been indicated, such a call is received over a calling line LE associated with a link JT (Fig. 1). Link JT is itself associated with an incoming first selector SEP1 controlled by director ORP1. Selector SEP1 and director ORP1 are identical with selector SEP and director ORP shown in Fig. 6. Where the call is intended for the subscriber of a local office, the routing of said call is done according to the same method already described. Where the call is intended for a subscriber of an office up the line from the office involved, that is, if it is a question of a transit call, the first translated digit received by director ORP1 characterizes a distant office or a group of distant offices instead of characterizing a group of 5000 local subscribers. Director ORP1 then selects a second selector SES1 assigned to outgoing calls (Fig. 1). Moreover, selector SES1 and the corresponding director are identical with selector SES and director ORS shown in Fig. 7; their operation is identical. Director ORS1 then selects a link JTS associated with a line LS terminating at the office up the line.

In the case of a call coming from a local subscriber and intended for a distant office, first director ORP (Fig. 1) selects a second selector SES1 or SES′1 assigned to outgoing calls. The operation is identical with that already described, with the sole difference that the translated digit received by director ORP characterizes a distant office or a group of distant offices instead of characterizing a group of 5000 local subscribers. In the case of Fig. 1, selector SEP gives access to four line-groups, that is, to two local groups and two groups assigned to outgoing calls. Selector SEP is capable of being routed by four different translated digits, so four G*p* relays have been provided in Fig. 6.

Contrariwise, in the case of an incoming call terminating at a first selector SEP1, only three different digits can be received, two of said digits corresponding to the local groups and the last of said digits corresponding to the groups assigned to outgoing calls. The group corresponding to outgoing calls need not be provided and it is represented in the figure by a dotted line. Such is the case, for example, where the office involved should not handle transit calls.

In the case where selector SEP1 gives access to three groups, each of said groups may comprise a number of lines ranging from 10 to 20 (20 lines for the first group and 15 lines for each of the other two). In the case where selector SEP1 gives access to only two groups, each of the 10 groups will comprise 25 lines.

In the preceding descriptions it has been assumed that the circuit of each relay such as T*ap* (Fig. 6) passes in series through back contacts of all the other relays, in order to prevent the simultaneous operation of two relays. It is quite obvious that other known arrangements may be used to obtain the same result. Various methods may be used, in particular, so that the different lines will be selected in order of preference and so that the order of selection will be modified continuously or intermittently. Thus, for example, a different order of selection can be adopted for the two first directors and the four second directors serving the same group of 500 subscribers, so that, if two calls occur at about the same instant and if the two first directors are free, each of the latter will give priority to one of these two calls.

The same remarks apply to all the relays arranged in a chain, such as G*c* (Fig. 5), G*s* (Fig. 8), etc.

It is quite obvious that the foregoing descriptions have been given only as a non-limitative example and that numerous modifications may be introduced without departing from the scope of the invention. Said descriptions concern the case of a system using cross-bar switches, but a certain number of recommended arrangements could be applied to other telephone systems such as those comprising rotary switches. Likewise, the subscribers could be arranged otherwise than in groups of 5000, 500 or 50, cross-bar switches could be provided comprising different selecting-magnet arrangements or of different capacity, and several selector groups could be associated with the director of any given selection stage.

I claim:

1. An automatic telephone exchange system comprising a plurality of groups of subscribers' lines, a plurality of register links, a register including means for connecting it to one of said register links, a plurality of cross-bar selector switches arranged in sets comprising a plurality of sets of a first type and a set of a second type, each of said sets of said first type including switches connected to the lines of a different one of said groups and second-line-finder switches connected to at least one of said register links and also including means for operating said line-connector switches and said second-line-finder switches for connecting a calling one of the lines of said one group to said register link and means for operating said line-connected switches for selecting a called one of the lines of said group, and said set of said second type including selector switches connected to said sets of said first type and being connected to said register links and also including means for operating said switches of said set of said second type for selecting the particular set of said first type having switches connected to a called line.

2. An automatic telephone exchange system, according to claim 1, in which the subscribers' lines of each group are divided into sub-groups and the line-connected switches in each first set of selector switches are first finders which cooperate with said second finders for connecting a calling line to the register, and in which means for operating the switches comprises a first director associated with the second finders serving a group of lines for selecting a second finder which has access to a calling line in the group and for controlling said second finder to select a first finder having access to the sub-group of lines including the calling line from among the various sub-groups in a group of lines, and a second director associated with said first finders for controlling said selected first finder to select a calling line from among the lines of said selected sub-group, and means for connecting each first-finder director to serve in common all the lines of the associated group and to have access to several second-finder directors individually associated therewith.

3. An automatic telephone exchange system, according to claim 1, in which the subscribers' lines of each group are divided into several sub-groups and the line-connected switches in the set of selector switches of the first type are final selectors and said set of switches of said first type further comprises a sub-group selector, a first director associated with each sub-group of lines for controlling the associated sub-group selector to select a called sub-group of lines from among various sub-groups in a group of lines, a second director associated with said final selectors for controlling a selected final selector to select said called line from among the lines in said sub-group, and means for connecting each final selector to serve in common all lines in a particular group and to be accessible to several sub-group selector directors individually associated therewith.

4. An automatic telephone exchange system, according to claim 3, in which each final selector comprises a single unit which acts also as a line finder and the director associated with said final selectors also controls said unit to cause it to select the calling line.

5. An automatic telephone exchange system, according to claim 1, in which the subscribers' lines of each group are divided into sub-groups and the line-connected switches in the set of selector switches of the first type are first finders and cooperate with the second finders for connecting a calling line to the register, and the means for operating said switch of said set of said first type comprises a second-finder-director associated with the second finders serving a group of lines for selecting a second finder which has access to a calling line in the group and for controlling said second finder to select a first finder having access to the sub-group of lines including the calling line from among the various sub-groups in a group of lines, and a first-finder director associated with said first finders for controlling said selected first finder to select a calling line from among the lines of said selected sub-group, means for connecting each first-finder director to serve in common all the lines in the associated group and to have access to several second-finder directors individually associated therewith, means responsive to a call on any of said lines for operating all of said first-finder directors serving the group of lines to which said calling line belongs to register two indications, one of which concerns the level of the line in the sub-group and the other the level of the sub-group in the group, means for transmitting said first indication to one of said second-finder directors, and means for subsequently transmitting said other indication to said one of said second-finder directors.

6. An automatic telephone exchange system, according to claim 5, in which there are a plurality of registers, and further comprising a plurality of register links having access to said registers, and means for causing each second-finder director to hunt, even in the absence of any call, for a second finder associated with an available register link giving access to at least one available register.

7. An automatic telephone exchange system according to claim 6, further comprising means responsive to the selection of a register link capable of routing the call for causing the selected second-finder director to hunt for an available first finder serving the calling sub-group, to connect the chosen second finder to the selected first finder, and to connect said first finder to the calling line.

8. An automatic telephone exchange system, according to claim 7, further comprising a plurality of register finders, a register-finder director, and means responsive to the connection of a register link with a calling line for causing said register-finder director to start hunting for a register link associated with an available register and, when said link is found, to complete the connection of said selected register through the associated register finder, said register link, the selected second finder, and the selected first finder to the calling line.

9. An automatic telephone exchange system, according to claim 8, further comprising means responsive to the busying of all the registers accessible to the register link before said link has had time to connect to a finder which had been available, for causing the second-finder director to release the seized second finder, to hunt for another second finder through which the call may be routed, and to cause said other second finder, when found, to be connected to the first finder seized by the calling line.

10. An automatic telephone exchange system, according to claim 9, in which each register finder gives access to a group of different register links, and further comprising means in the register-finder director for choosing a register finder associated with an available register and providing access to the group in which the calling register link is included.

11. An automatic telephone exchange, according to claim 4, further comprising means responsive to the selection of a called group of lines for registering the indication of the called line with respect to the group in the sub-group-selector director, means in said sub-group-selector director for causing the seizure of the associated first-finder director, and for sending a signal representing the received call to said first-finder director, means in said first-finder director for translating said signal and registering the indication relating to the called sub-group and to the level of the called line in the sub-group, respectively, and means for thereupon transmitting the first indication to the sub-group-selector director.

12. An automatic telephone exchange system, according to claim 11, further comprising means in the sub-group selector director, responsive to the registration therein of the indication regarding the called sub-group and of the registration in the first-finder director of the indication regarding the called line in said sub-group for causing said sub-group-selector director to start hunting for an available first finder capable of serving the called sub-group, to connect the selected first finder to the sub-group selector and then to connect said first finder to the called line.

13. An automatic telephone exchange system, according to claim 12, in which the first-finder director comprises a marking and dialing distributor having a plurality of input and output terminals, wherein each input terminal corresponds to one of the call indications of the lines in the group and each output terminal corresponds to the position occupied by the line with respect to the first finder switches, and a plurality of movable connections for connecting any input terminal with an output terminal, so that by simply moving some of said connections a given call indication may be assigned to any line in the group.

14. An automatic telephone exchange system, according to claim 4, further comprising means in each first-finder director for receiving a call signal, means for translating said signal into first and second indications and registering said indications, said first indication representing the sub-group in which the called line is included and said second indication the level occupied by the line of the sub-group, means in said first-finder director to transmit said first indication to said sub-group selector director, and means in said translating and registering means for preventing the indication regarding the wanted line from affecting the other lines in the group.

15. An automatic telephone exchange system, according to claim 14, in which certain groups of lines represent a single subscriber and the indication transmitting means transmits a signal representing said multi-line subscriber, and further comprising chain circuits arranged so that only one sub-group and one line in a sub-group are selected.

16. An automatic telephone exchange system, according to claim 15, in which the movable connectors are arranged to connect the distributor output terminal associated with a group line having a particular call signal to the input terminal associated with the common call signal of the group and to the input terminal associated with said particular call signal, a rectifier being provided in one of said connections to prevent current flow between the various terminals.

17. An automatic telephone exchange system, according to claim 14, further comprising means for changing the circuits transmitting the called sub-group indication to the sub-group selector director when the first-finder director is not associated with any first finder capable of serving the called sub-group for causing said sub-group-selector director to start hunting for an available cooperating selector having access to at least an available first finder capable of serving the called sub-group, means in the sub-group selector for thereupon transmitting a signal to the register and thereupon connecting the sub-group selector to the selected cooperating selector, means for releasing the seized directors, means for transmitting the call signal that characterizes the called line in the group to the cooperating selector, and means for causing the cooperating selector to hunt for an available first finder capable of serving the called sub-group.

18. An automatic telephone exchange system, according to claim 17, further comprising means, responsive to all the first finders connected to the cooperating selector terminal banks and capable of serving the called sub-group becoming busy before there is time to select one of them, for causing said cooperating selector to transmit to the register a signal identical with that sent before by the sub-group selector when hunting for a cooperating line, and means responsive to the condition of said register as a result of having received the first signal for causing the release of said register and the release of the whole chain of different seized members.

19. An automatic telephone exchange system, according to claim 17, in which several lines associated with the same call signal are included in different sub-groups, further comprising means responsive to the availability of first finders to some of said sub-groups and not to others for causing the director to choose an available first finder but not to hunt over the cooperating group, priority being thus given to the group lines that can be reached without the help of a cooperating selector.

20. An automatic telephone exchange system, according to claim 19, further comprising means responsive to the unavailability of first finders to sub-groups including all the lines associated with the same call signal for causing the director associated with the sub-group selector to choose an available cooperating selector having access to at least an available first finder capable of serving one of said sub-groups.

21. An automatic telephone exchange system, according to claim 20, in which the first selector director comprises a dialing distributor having a plurality of input and output terminals, each input terminal of which is associated with one of the selection combinations used for directing the first finder, it being possible for several terminals to be associated with one and the same selection combination, and each output terminal of which is associated with a set of several out-going lines of a first type selector, and a plurality of movable connections for selectively connecting one or more of said sets of lines with a given group of lines.

22. An automatic telephone exchange system comprising a plurality of subscribers' lines arranged in groups, a plurality of registers, a plurality of register links having access to said registers, a plurality of selector switches arranged in first and second sets, the switches of said first set being individually connected to the groups of lines and in common to said registers, and being arranged for connecting a calling line to said register and for selecting the called line from among the group of lines, the switches of said second set of switches being connected in common to all the lines of the exchange and being arranged for selecting the group of the called line, said second set of switches including first finder switches and second finder switches and a second finder director, and means for causing said second finder director to hunt, even in the absence of any call for a second finder associated with an available register link giving access to at least one available register.

23. An automatic telephone exchange system comprising a plurality of subscribers' lines arranged in groups, the lines of each group being divided into several sub-groups, a register, a plurality of selector switches arranged in first and second sets, the switches of said first set being individually connected to the groups of lines and in common to said register and being arranged for connecting a calling line to said register and for selecting the called line from among the group of lines, the switches of said second set of switches being connected in common to all the lines of the exchange and being arranged for selecting the group of the called line, said first set of selector switches comprising a sub-group selector and a final selector, a director associated with each sub-group of lines and arranged for controlling the associated sub-group selector to select a called sub-group of lines from among various sub-groups in a group of lines, another director associated with said final selector and arranged for controlling said final selector to select said called line from among the lines in said sub-group, said directors being arranged in such a way that all the lines in a group are served in common by the said final-selector directors and that each of said directors is accessible to several sub-groups selector directors individually associated therewith, said system further comprising means responsive to the selection of a called group of lines for registering an indication of the called line with respect to the groups in the sub-group selector director, means in said sub-group selector director for causing the seizure of the associated final selector director, and for sending a signal representing the received call to said final selector director, means in said final selector director for translating said signal and registering the indication relating to the called line sub-group and to the level of the called line in the sub-group, respectively, and means for thereupon transmitting the first indication to the sub-group selector director.

24. An automatic telephone exchange system comprising a plurality of subscribers' lines arranged in groups, the lines of each group being divided into several sub-groups, a register, a plurality of selector switches arranged in first and second sets, the switches of said first set being individually connected to the groups of lines and in common to said register and being arranged for connecting a calling line to said register and for selecting the called line from among the group of lines, the switches of said second set of switches being connected in common to all the lines of the exchange and being arranged for selecting the group of the called line, said first set of selector switches comprising a sub-group selector and a final selector, a director associated with each sub-group of lines and arranged for controlling the associated sub-group selector to select a called sub-group of lines from among various sub-groups in a group of lines, another director associated with said final selector and arranged for controlling said final selector to select said called line from among the lines in said sub-group, said directors being arranged in such a way that all the lines in a group are served in common by the said final-selector directors and that each of said directors is accessible to several sub-group selector directors individually associated therewith, said system further comprising means in each final selector director for receiving a call signal, means for controlling said signal into first and second indications and registering said indications, said first indication representing the sub-group in which the called line is included and said second indication representing the level occupied by the line of the sub-group, means in said final selector director to transmit said first indication to said sub-group-selector director, and means in said translating and registering means for preventing the indication regarding the wanted line from affecting the other lines in the group.

25. An automatic telephone exchange system, as claimed in claim 1, each of said sets of switches of the first type comprising a first finder, and a first finder director associated therewith, said first finder director comprising a marking and dialing distributor having a plurality of input and output terminals, wherein each input terminal corresponds to one of the call indications of the lines in the group and each output terminal corresponds to the position occupied by the line with respect to the first finder switch, and a plurality of movable means for selectively assigning a given call indication to any line in the group.

26. An automatic telephone exchange system, as claimed in claim 1, said set of switches of the second type comprising a first selector and a first selector director, said first selector director comprising a dialing distributor having a plurality of input and output terminals, each input terminal of which is associated with one of the selection combinations used for directing said first selector, it being possible for several terminals to be associated with one and the same selection combination, and each output terminal of which is associated with a set of several outgoing lines of a selector of the first type, and a plurality of movable connections for selectively connecting one or more of said sets of lines with a given group of lines.

References Cited in the file of this patent

UNITED STATES PATENTS

| | | |
|---|---|---|
| 2,585,904 | Busch | Feb. 19, 1952 |
| 2,587,103 | Boyer | Feb. 26, 1952 |